US011303449B2

(12) United States Patent
Peddada

(10) Patent No.: US 11,303,449 B2
(45) Date of Patent: Apr. 12, 2022

(54) USER DEVICE VALIDATION AT AN APPLICATION SERVER

(71) Applicant: salesforce.com, inc., San Francisco, CA (US)

(72) Inventor: Prasad Peddada, Alameda, CA (US)

(73) Assignee: salesforce.com, inc., San Francisco, CA (US)

( * ) Notice: Subject to any disclaimer, the term of this patent is extended or adjusted under 35 U.S.C. 154(b) by 443 days.

(21) Appl. No.: 16/015,768

(22) Filed: Jun. 22, 2018

(65) Prior Publication Data

US 2019/0394042 A1    Dec. 26, 2019

(51) Int. Cl.
*H04L 29/06* (2006.01)
*H04L 9/32* (2006.01)
*H04L 67/141* (2022.01)
*H04L 9/08* (2006.01)
*G06F 16/27* (2019.01)

(52) U.S. Cl.
CPC ............ *H04L 9/3226* (2013.01); *G06F 16/27* (2019.01); *H04L 9/0866* (2013.01); *H04L 9/0894* (2013.01); *H04L 9/3268* (2013.01); *H04L 63/166* (2013.01); *H04L 67/141* (2013.01)

(58) Field of Classification Search
CPC ... H04L 9/3226; H04L 67/141; H04L 9/3268; H04L 9/0866; H04L 9/0894; H04L 63/166; H04L 63/0823; H04L 9/0825; H04L 9/14; G06F 16/27; H04W 12/0609
See application file for complete search history.

(56) References Cited

U.S. PATENT DOCUMENTS

| 2003/0099353 | A1* | 5/2003 | Goh | G07F 7/08 380/51 |
| 2006/0080257 | A1* | 4/2006 | Vaughan | G06Q 10/10 705/51 |
| 2009/0198997 | A1* | 8/2009 | Yeap | H04L 63/0823 713/155 |
| 2010/0169963 | A1* | 7/2010 | Kleinpeter | H04L 9/3263 726/10 |
| 2010/0313249 | A1* | 12/2010 | Castleman | H04L 67/10 726/5 |
| 2012/0324556 | A1* | 12/2012 | Yefimov | H04L 67/00 726/7 |

(Continued)

*Primary Examiner* — Jorge L Ortiz Criado
*Assistant Examiner* — Kevin Ayala
(74) *Attorney, Agent, or Firm* — Holland & Hart LLP

(57) ABSTRACT

Methods, systems, and devices for validation at an application server are described. The application server may validate a user device utilizing a public-private key pair, and may refrain from establishing a database connection until the user device is validated. For example, the application server may transmit a private key and a public key identifier to the user device. When the application server receives a session establishment message that is based on a private key and that contains the public key identifier, the application server may determine the public key of the public-private key pair based on the identifier. The application server may validate that the session establishment message is received from the user device based on the private key and the determined public key. Based on this validation procedure, the application server may establish a database connection with a database, granting the validated user device access to requested data.

19 Claims, 12 Drawing Sheets

(56) References Cited

U.S. PATENT DOCUMENTS

| | | | |
|---|---|---|---|
| 2014/0258256 A1* | 9/2014 | Dee | G06F 9/547 |
| | | | 707/705 |
| 2016/0105429 A1* | 4/2016 | Boenisch | H04L 63/062 |
| | | | 713/171 |
| 2017/0012955 A1* | 1/2017 | Petrack | H04L 67/02 |
| 2018/0167367 A1* | 6/2018 | John | H04L 9/0825 |
| 2019/0149527 A1* | 5/2019 | John | H04L 63/0853 |
| | | | 713/171 |
| 2019/0349426 A1* | 11/2019 | Smith | H04L 67/104 |
| 2020/0028672 A1* | 1/2020 | Tang | H04L 9/3297 |
| 2020/0394621 A1* | 12/2020 | Lakshmanan | G06Q 30/0185 |

\* cited by examiner

USER DEVICE VALIDATION AT AN APPLICATION SERVER

FIELD OF TECHNOLOGY

The present disclosure relates generally to database systems and data processing, and more specifically to user device validation at an application server.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some systems, a user device may request access to resources stored within a database. In large database systems, databases may receive thousands of application programming interface (API) calls from different user devices requesting access to the database (e.g., to retrieve data, modify data records, etc.). In some cases, for data security purposes, a user device may only access these resources after passing an authentication procedure. However, authenticating the user device at the database may require establishing a connection between the user device and database (e.g., in order to transmit user credentials for authentication to the database) prior to validating the session, resulting in security risks for the resources. That is, in some cases, a user device without valid authentication information may utilize this initially established connection to perform malicious attacks on the data stored at the database. Additionally or alternatively, channeling thousands of API calls from different user devices to the database for authentication may result in a large overhead at the database, limiting the efficiency of the database system due to this authentication bottleneck.

DETAILED DESCRIPTION

Figure 1:
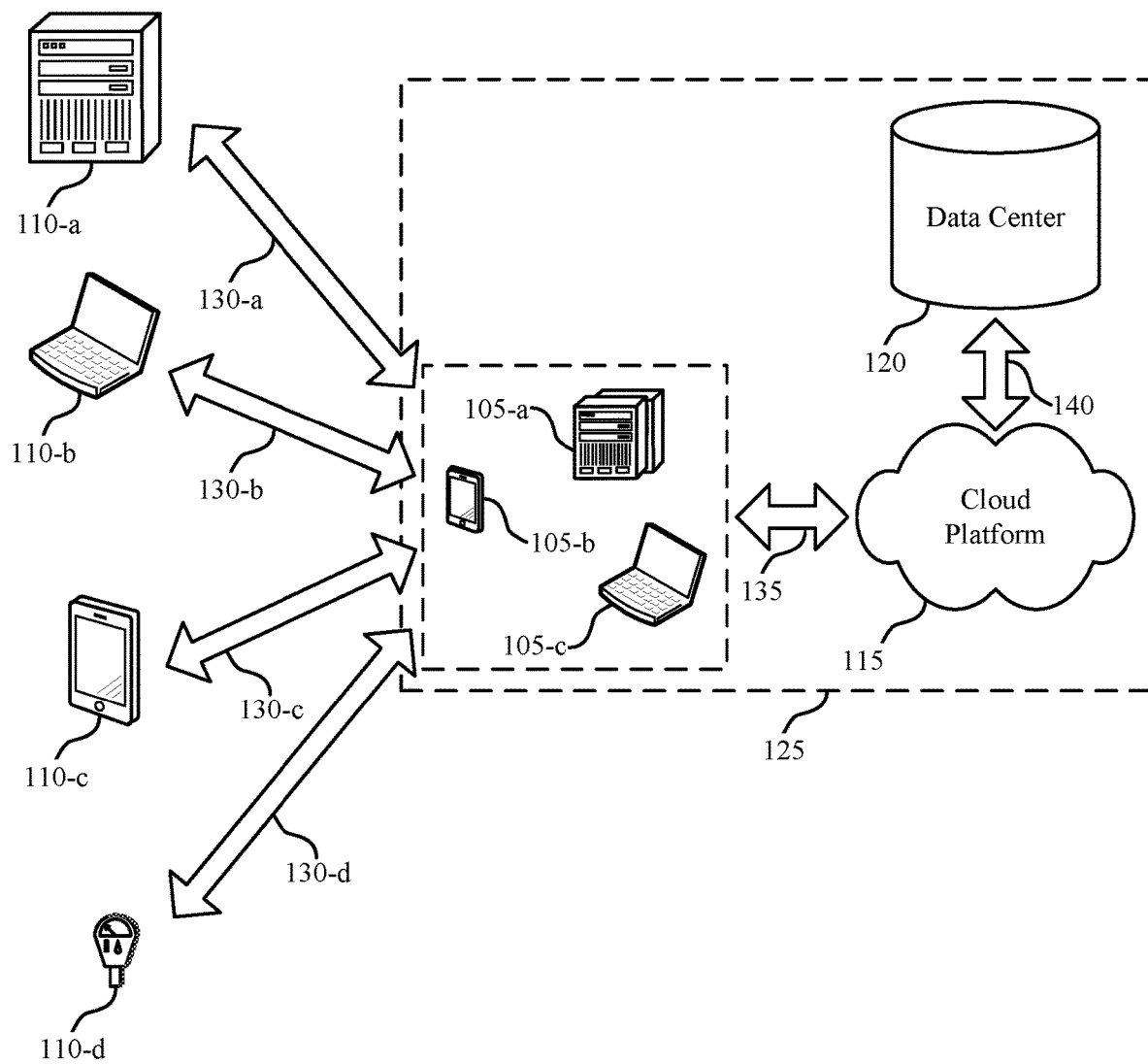
FIG. 1 illustrates an example of a system for cloud computing that supports user device validation at an application server in accordance with aspects of the present disclosure.

A cloud computing system may support customer relationship management (CRM) software, tools, and/or data storage. For example, a shared network of servers may host or support applications for managing customer data, improving customer interactions, accessing sales, service, or marketing related information, or some combination thereof. Multiple users associated with multiple tenants (e.g., organizations) may store, access, and modify data using the cloud-based CRM applications. The data for these users or tenants may be stored in a distributed, multi-tenant database system. The following described techniques may support improved user access to CRM data or applications provided by the system, or improved user access to any other types of data or applications (e.g., hosted in the cloud) supported by a database system.

Large database systems may contain one or more databases served by a set of servers, which may be referred to as application servers or database servers. These application servers may act as gateways for user devices to access the databases. For example, an application server may perform functionality or run applications for handling application programming interface (API) calls, modifying or accessing data records, or any other operations associated with the database system. In large database systems serving a large number of users or user devices (e.g., thousands or millions of devices), multiple application servers are used to handle traffic, where the processing is distributed across the application servers to efficiently utilize the server processing and memory resources. In this way, when an API call is received at the database system, the call may be dynamically routed to an application server in order to balance the load across the system. However, distributing functionality across a number of application servers may lead to challenges with maintaining consistency throughout the system. To deal with this, some systems may handle certain operations (e.g., session validation or maintaining session state) at the database itself, rather than across many separate servers. This results in each applications server hitting the database for these operations, creating a bottleneck within the database system.

To reduce the load on the database, an application server may validate user devices without hitting the database with session authentication requests. For example, each application server may locally support validation for a user device by utilizing a public-private key pair. The application server may transmit the private key of the public-private key pair to a user device (e.g., when setting up the user device as a valid API client), along with either a user certificate or a key identifier (ID) value. In some cases, the application server may store the corresponding public key in memory with the associated key ID value. When the application server receives a request to establish a valid session from the user device, the request may be based on the private key (e.g., signed by the private key, include information encrypted with the private key, etc.) and may include either the certificate or the key ID value. If the application server receives a certificate, the application server may verify the certificate if the certificate was issued by the application server or another server associated with the database system, and may identify the public key encapsulated by the certificate. If the application server receives a key ID value, the application server may retrieve from memory the public key corresponding to the key ID value. The application server may validate the user device if the identified or retrieved public key and the utilized private key correspond to a valid public-private key pair. The application server may establish a database connection for performing API calls for the user device only if this validation procedure at the application server is successful. Additionally or alternatively, a similar procedure to the one above may be performed to maintain session state at a server without hitting the database. This may support stateful applications within the system, reducing the need for hitting the database to determine user or session state information.

Validating the user device at the application server based on the private key may involve a mutual transport layer security (mTLS) procedure or an API call validation. For example, the request transmitted from the user device to the application server may be generated using the private key and may include a user certificate (e.g., the issued certificate or another certificate). The application server may perform an mTLS procedure to validate the identity of the user device based on this request. In another example, the user device may transmit a request header (e.g., for an API call) to the application server that is signed by the private key, and the application server may validate the user device based on the received API call. In some cases, this request header may additionally include the certificate or the key ID value.

In some cases, the private key may be stored in volatile memory at the application server, while the public key is stored in non-volatile memory. For example, the application server may receive a request to generate a public-private key pair, where the request includes a single-use token from the user device. The application server may dynamically generate the public-private key pair based on the single-use token, and may transmit the private key to the user device without storing the private key in persistent memory of the application server. In contrast, the public key may be stored in persistent memory (e.g., non-volatile memory) and cached on the application server. In some cases, an association between the public key and the private key may be stored in the database (e.g., for recovery at an application server, or for distribution to other application servers). If more than one user device requests a session with the application server, the application server may transmit a private key and key ID value/certificate to each user device requesting the session. For example, each user device may receive a different private key and key ID/certificate pair. In some examples, if more than one user device is assigned to the same user, each user device may receive the same private key and key ID/certificate pair or each user device may receive a different private key and key ID/certificate pair. In some cases, the application server may store each public-private key association in a table. For example, the table may organize each public-private key pair association (e.g., including the key ID value, user device identification information, etc.) according the user device associated with the user. In this way, the application server may map the user device to the corresponding user.

Aspects of the disclosure are initially described in the context of an environment supporting an on-demand database service. Additional aspects of the disclosure are described with respect to systems, timelines, and process flows. Aspects of the disclosure are further illustrated by and described with reference to apparatus diagrams, system diagrams, and flowcharts that relate to user device validation at an application server.

FIG. 1 illustrates an example of a system 100 for cloud computing that supports user device validation at an application server in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some systems 100, subsystem 125 may support user device validation at an application server. For example, an application server—which may be a component of the cloud platform 115 or data center 120—may validate a user device (e.g., a cloud client 105 or contact 110) to access resources associated with a database of the data center 120 using a public-private key pair. For example, the application server may initially transmit the private key of the public-private key pair and a certificate or key ID value to the user device. The application server may store an association between the public key of the public-private key pair and the key ID value. For example, the application server may store the association in a persistent memory cache of the application server. The application server may receive a session establishment message, where the session establishment message is based on the private key and includes the certificate or the key ID value. The application server may validate whether the session establishment message is received from a valid user device (e.g., a user device with sufficient credentials to access data in the database). During this validation procedure, the user device may be validated to access resources associated with the database based on the public key encapsulated by the certificate, or based on the stored association between the public key and the key ID value (e.g., by verifying the public-private key pair). The application server may establish a database connection with the database upon successful completion of the validation procedure.

In conventional systems, every API call from a user device may hit the database to validate whether the user device may access data stored at the database. In some cases, the database may validate, for each API call, whether a user device has the correct credentials to access the requested data. In other cases, after an initial validation procedure for the user device (e.g., based on a login procedure utilizing a user name, password, personal identification number (PIN), biometric input, or a combination thereof), the database may establish a session associated with the user device, and may check whether this session is still valid when receiving additional API calls from that user device. In either case, this validation procedure may occur at the database, as the database stores the tenant data, user data, and resource metadata used to determine which users have access to what data.

These API calls may be sent from multiple user devices, and the traffic for each user device may be routed through a corresponding application server (e.g., based on a previous connection or a load-balancer). Accordingly, each application server may forward the API calls or information associated with the API calls (e.g., session identification information) to the database in order to validate the user device. By performing the device validation or session authentication at the database, the load on the database may increase due to each incoming request resulting in processing at the database. In some cases, the latency and resource overhead associated with the application server may also increase because the user device session may be validated every time the database system receives a request. In other examples, a malicious user may perform modified resource requests using an unauthorized user device, and these modified resource requests may gain access to the database before the database validates whether a session between the database and the user device is valid. In such an example, forwarding each API call to hit the database prior to validating the session may introduce security risks to the database resources. That is, in conventional systems, the application server may establish a database connection prior to validation, throttling the flow of traffic, increasing latency and resource overhead, and compromising the security of the database.

To efficiently and securely handle these many API calls, the system 100 may implement a procedure to validate the user devices sending the API calls at an application server without hitting the database. This may reduce the load on the database (e.g., by reducing the number of database operations for validating user device data requests) while also improving security, as the application server may only establish a database connection if a user device is successfully authenticated. Accordingly, because the application server validates the user device without hitting the database, the user device may not have access to any resources within the database before the user device or a session for the user device is authenticated. In this way, system 100 may improve the security of the database, as unauthorized user devices may not be granted access to even an initial database connection. Additionally, system 100 may reduce the overhead at the database by validating user devices at application servers as opposed to the database, distributing the processing overhead across multiple servers. This may allow the database to host more tenants and support more users and/or user devices without exceeding certain resource or latency thresholds or requirements. Accordingly, the database may scale usage of clients (e.g., tenants, users, user devices, etc.) in a multi-tenant database system. By using a public-private key pair and a certificate, a key ID value, or both for the validation procedure, performing the validation may efficiently utilize the available memory at the application servers.

For example, an application server may assign the user device a public-private key pair that may validate the user device for access to resources associated with the database. In such an example, the public key may be encapsulated within the certificate issued to the user device, or the public key may be stored at the application server with an association to the key ID value. The private key may be transmitted to the user device, and security of the private key may be the responsibility of the user device (e.g., similar to a password), so that the public key may be shared and persisted in memory of multiple application servers. If a request that is associated with the private key is received at any of these application servers, then the receiving application server may validate the user device based on successfully associating the private key to the public key of the public-private key pair. This public-private key pair storage configuration may result in a secure system 100, as the private key is stored by a single device (i.e., the associated user device).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
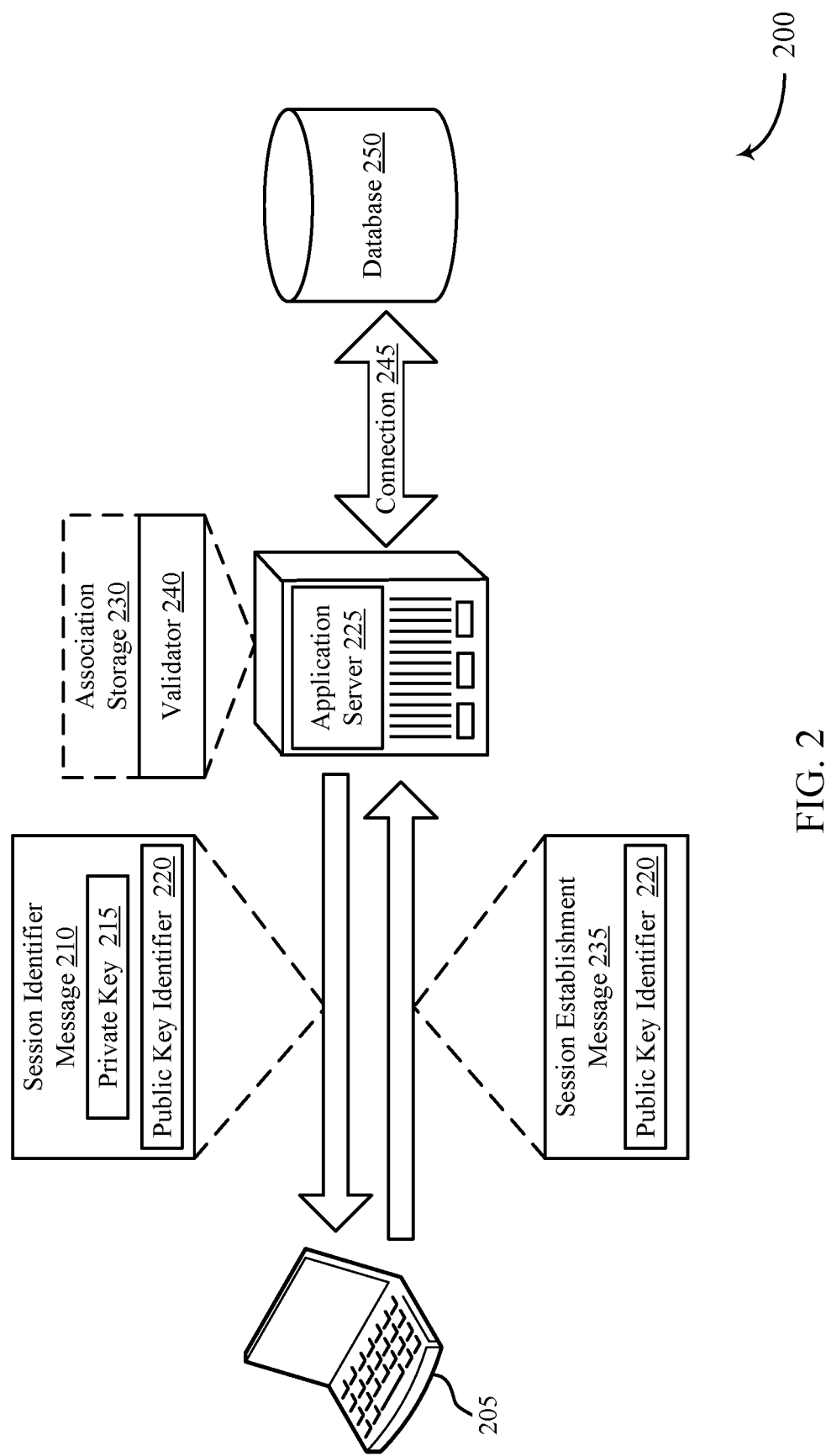
FIGS. 2 through 4 illustrate examples of systems that support user device validation at an application server in accordance with aspects of the present disclosure.

FIG. 2 illustrates an example of a system 200 that supports user device validation at an application server in accordance with aspects of the present disclosure. The system 200 may include a user device 205, an application server 225, and a database 250. The user device 205, the application server 225, and the database 250 may be components of the subsystem 125, as described with reference to FIG. 1. For example, the user device 205 may be an example of a cloud client 105, the application server 225 may be a component of the cloud platform 115, and the database 250 may be a component of the data center 120. The application server 225 may be an example of a single server or a server cluster, or may be an example of one or more software modules implemented within other devices.

The user device 205 may be associated with the application server 225. In some cases, the user device 205 may request to access data associated with the application server 225. For example, the application server 225 may have access to data stored in the database 250 (e.g., such as a data center 120, as described with reference to FIG. 1), and may manage requests for this data. The database 250 may use multiple application servers 225 to handle data requests from user devices 205 within a database system. In some cases, when the database system receives a request or a message from a user device 205, the system may dynamically select an application server 225 to handle the request or message (e.g., based on a load-balancer, or based on the selected application server 225 previously handling requests for the user device 205).

For the application server 225 to allow the user device 205 to access data stored in the database 250, the application server 225 may transmit a session identifier message 210 to the user device 205. The session identifier message 210 may include a private key 215 and a public key identifier 220. In some cases, this public key identifier 220 may be an example of a certificate issued by a certificate authority. In some examples, the private key 215 and the public key identifier 220 may be paired with a corresponding public key stored in the application server 225. For example, when generating a private key-public key pair, the application server 225 may store the public key in a local memory storage system of the application server 225 along with an indication of the associated public key identifier 220, and may transmit the private key 215 and the public key identifier 220 to the user device 205. For example, the application server 225 may contain association storage 230 for storing associations between public keys of the public-private key pairs and user-specific or user device-specific key ID values associated with the private key 215. The association storage 230 may store the key ID value to identify a public key associated with a private key 215. In some cases, this key ID may be an example of a string (e.g., a fifteen-character ID) specific to a public-private key pair that maps to a specific tenant or user associated with a tenant. In some cases, the application server 225 may not store the public key or public key identifier 220 on the server-side. Instead, the user device 205 may store the private key 215 and a certificate encapsulating the corresponding public key, and the application server 225 may identify the public key from the received certificate.

The user device 205 may receive the private key 215 and the public key identifier 220 included in the session identifier message 210. The user device 205 may determine to use the private key 215, the public key identifier 220 (e.g., the certificate, the key ID value, etc.), or some combination of these when transmitting a session establishment message 235 to establish a session with the database 250. In some cases, the public key identifier 220 may be associated with the private key 215. For example, a certificate may be associated with a private key 215 based on the association with the corresponding public key contained within the certificate. Similarly, a key ID may be associated with a private key 215 based on the association with the corresponding public key stored at the application server 225. The user device 205 may transmit the session establishment message 235 to the application server 225. In some cases, the user device 205 transmits the session establishment message 235 to the database system containing the database 250 supported by multiple application servers, and the session establishment message 235 is routed to one application server 225 for handling. This session establishment message 235 may indicate that the user device 205 requests to establish a session with the database 250 (e.g., explicitly as a session establishment message, or implicitly with a request to access data stored in the database 250). In some case, the session establishment message 235 may additionally include an indication of requested resources to retrieve from, modify, or store in the database 250. In some cases, the session establishment message 235 may be an example of a client certificate message which may be generated by the user device 205 as part of an mTLS procedure using the private key 215 and may including the certificate. In other examples, the session establishment message 235 may be an example of an API call and may be signed with the private key 215. In one specific example, the session establishment message 235 may include a JavaScript object notation (JSON) web token (JWT) generated by the user device 205 using the private key 215.

The application server 225 may receive the session establishment message 235. In some cases, the application server 225 may identify the public key identifier 220 included in the session establishment message 235 or indicated by the private key 215 of the session establishment message 235. For example, the application server 225 may include a validator 240 that may validate that the session establishment message 235 is received from the user device 205 based on a received certificate or based on a stored association between the public key and the private key 215. In a first example, the application server 225 may determine the public key based on a received certificate (e.g., retrieving the public key from metadata associated with the certificate, extracting the public key from the certificate, etc.), and may verify that the determined public key corresponds to a public-private key pair with the private key 215 used for the session establishment message 235. In some cases, to validate the user device 205, the application server 225 may verify that the certificate included in the session establishment message 235 is a valid certificate granting access to requested tenant data (e.g., a certificate issued by the application server 225 or the database 250). In a second example, the application server 225 may determine the public key based on a key ID value included in the session establishment message 235 and based on a list of public keys stored in the association storage 230. That is, the validator 240 may identify the public key stored in memory that corresponds to the key ID value, and may determine whether the public key corresponds to a public-private key pair with the private key 215 used for the session establishment message 235. In either of these examples, the session establishment message 235 transmitted from the user device 205 may not hit the database 250, but rather be handled at the application server 225 based on the certificate or the public-private key pair association stored in the application server 225. Issuing the private key 215 may be sufficient for the application server 225 to validate that the user device 205 is operated by a valid user of a trusted tenant.

The application server 225 may establish a database connection 245 with the database 250 if the user device 205 is validated. In some examples, the validator 240 may grant the user device 205 access to resources associated with the database 250. In some cases, the validator 240 may grant the user device 205 access to a subset of resources associated with the database 250 (e.g., application-specific resources, tenant-specific resources, or a combination thereof). If the user device 205 is found to be invalid (e.g., the private key 215 used for the session establishment message 235 does not correspond to the public key encapsulated by the certificate or stored in memory for the user device, the certificate or key ID value is invalid or revoked, the public key identifier 220 does not grant access to the requested resources, etc.), the application server 225 may terminate the session establishment message 235 at the application server 225 without establishing the database connection 245. In this way, a session establishment message 235 is not granted access to the database 250 unless the user device 205 is first identified as a valid user device 205 by the application server 225.

Figure 3:
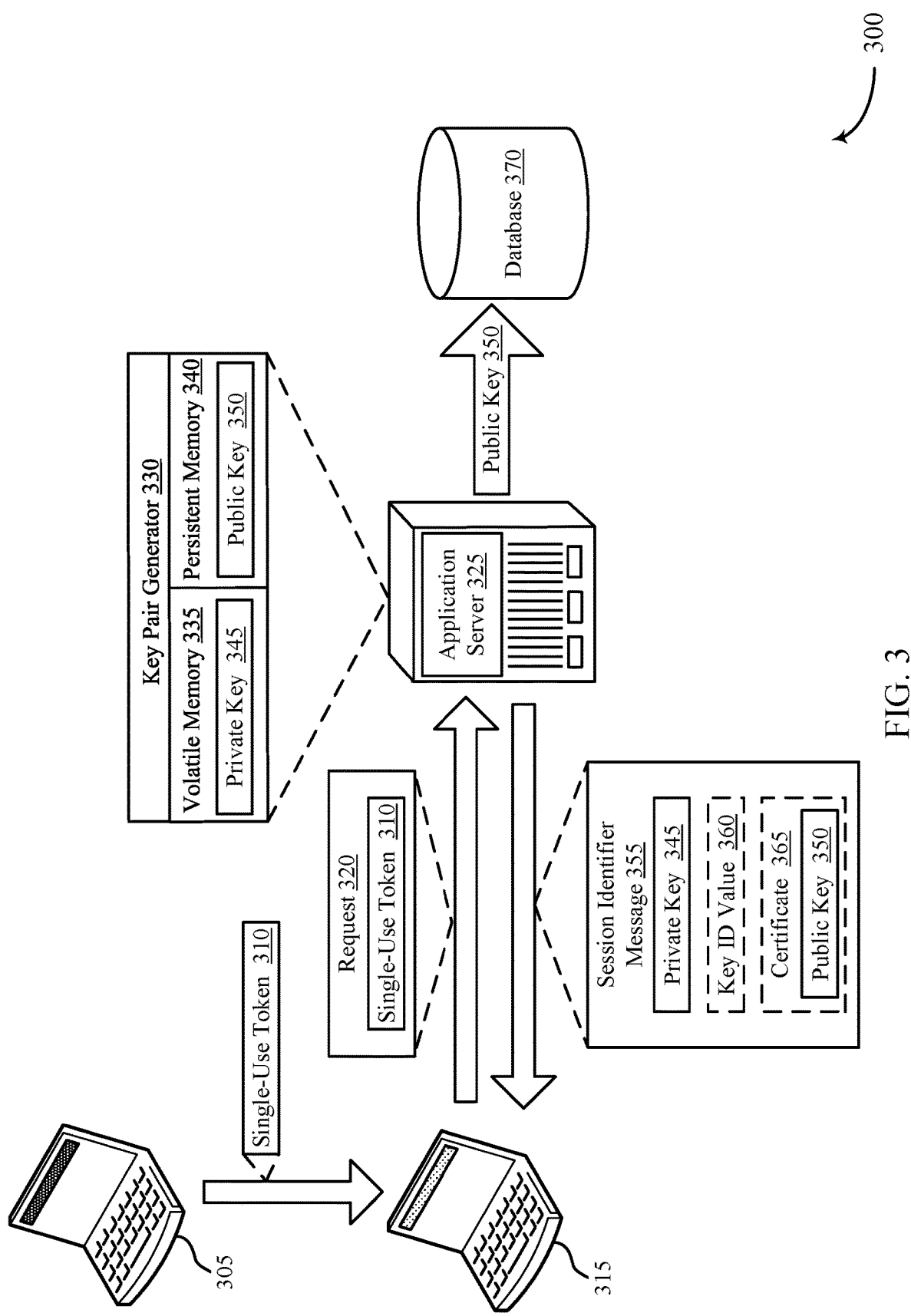

FIG. 3 illustrates an example of a system 300 that supports user device validation at an application server in accordance with aspects of the present disclosure. The system 300 may include an administrator 305 (e.g., a user device associated with an administrative user of the database system), a user device 315, an application server 325, and a database 370, which may be examples of the corresponding devices described with respect to FIGS. 1 and 2.

The administrator 305 may transmit a single-use token 310 to the user device 315. For example, the administrator 305 may issue the single-use token 310 to add the user device 315 as a valid user device with authorization to access data (e.g., all data or a subset of data) stored at the database 370. In some cases, issuing single-use tokens 310 to user devices 315 may be part of an onboarding process for a tenant, or may be triggered when a tenant associated with the database 370 requests to add new users or user devices 315 to a list of valid users or user devices with access to resources at the database 370.

In some cases, the administrator 305 may obtain the single-use token 310 by transmitting a request message (e.g., an HttpRequest) to the application server 325. If the application server 325 receives the request, the application server 325 may transmit a link to the administrator 305 or to the user device 315. This link may be embedded within an email to the administrator 305 or to the user of the user device 315, or may be transmitted in any other form of messaging. The administrator 305 may then access the link to obtain the single-use token 310. In some cases, the link may be an example of a single-use link, and may become inactive once the administrator 305 uses the link for the first time. If the link expires before the administrator 305 accesses the link, the administrator 305 may send an additional request to the application server 325 to receive an additional link. In some cases, the administrator 305 may access the link to obtain the single-use token 310 with or without inputting a username, password, or any other identification information. In other examples, the application server 325 may transmit a pseudo-randomly generated single-use token 310 to the administrator 305, as opposed to transmitting the link. In yet other examples, the single-use token 310 may be an example of a link, and a user of the user device 315 may select the link in order to trigger transmission of a request 320.

The user device 315 may receive the single-use token 310 from the administrator 305. The user device 315 may transmit a request 320 to the database system, where the request 320 may include the single-use token 310 or may be generated based on the single-use token 310. In some cases, the request 320 may include an indication to exchange the single-use token 310 for a private key 345. In addition, the request may include an indication to assign the private key 345 to the user device 315. The application server 325 may receive the request 320, generate the private key 345, and exchange the single-use token 310 for a private key 345. In some cases, the application server 325 may receive a single request 320 and may process the request 320 before receiving an additional request 320.

The application server 325 may include a key pair generator 330, where the key pair generator 330 may generate the private key 345 and a public key 350 corresponding to the private key 345. In some cases, the key pair generator 330 may include components or functions hosted in volatile memory 335 of the application server 325, persistent memory 340 of the application server 325, or a combination thereof. The application server 325 may generate the private key 345 in volatile memory 335. For example, the application server 325 may dynamically generate the private key 345 without storing the private key 345 within persistent memory 340 of the application server 325. By never storing the private key 345 in persistent memory 340 of the application server 325, confidential information associated with the user device 315 (e.g., the private key 345) may be removed from the memory of the application server 325 upon reboot, upon flushing the volatile memory 335 (e.g., random access memory (RAM)), or upon garbage collection of a virtual machine (e.g., a Java virtual machine (JVM)).

The key pair generator 330 may generate the public key 350 and, in some cases, may store the public key 350 in persistent memory 340. The persistent memory 340 may be an example of a memory cache, non-volatile memory, or a combination thereof. By storing the public key 350 in persistent memory 340, the application server 325 may maintain the public key 350 locally through volatile memory 335 flushes, reducing the need for the application server 325 to refresh the public key 350 information. The application server 325 may store the public key 350 in memory with an indication of an associated key ID value 360 for the user device 315. In some examples, the associated key ID value 360 is also generated when the public-private key pair is generated. Additionally or alternatively, the application server 325 may generate a certificate 365 containing an indication of the public key 350. This certificate 365 may support derivation of the public key 350. In such cases, the application server 325 may not store the public key 350 in persistent memory 340 (e.g., if the application server 325 may determine the public key 350 from a received certificate 365).

The application server 325 may transmit the public key 350, the associated key ID value 360, the certificate 365, or a combination thereof to the database 370 for storage. If an application server 325 receives a session establishment message (e.g., a request for resources) from a user device 315, and the application server 325 identifies that a public key 350 or key ID value 360 associated with the user device 315 is not stored in memory, the application server 325 may transmit a request to the database 370 for this information. For example, if the persistent memory 340 of the application server 325 is flushed via a cache flushing command, the public key 350, key ID value 360, or both may be retrieved from the database 370. In other cases, the public key 350, the indication of the associated key ID value 360, or both may be removed from the persistent memory 340 according to a time-to-live (TTL) value, a least-recently-used (LRU) policy, or a combination thereof. In yet other cases, a different application server 325 serving the database 370 may generate the public-private key pair, and may store the public key 350, the key ID value 360, or both locally in memory. In these cases, transmitting the public key 350 and the key ID value 360 to the database 370 may provide a mechanism for distributing the public key 350 and/or key ID value 360 to the other application servers 325 in the database system. The first time that an application server 325 handles a call from the specific user device 315, the application server 325 may retrieve the information for the user device 315 from the database 370 (e.g., assuming a different application server 325 previously handled a single-use token 310 for that user device 315), and then may store the information (e.g., the associated public key 350, key ID value 360, or both) in persistent memory 340 in order to handle future calls from that user device 315. This may allow each application server 325 in the database system to support validating user devices 315 locally without hitting the database 370 once the application servers 325 receive the public key 350 and key ID value 360 information from the database 370. In some cases, the database 370 may periodically or aperiodically (e.g., triggered by receiving public key 350 or key ID value 360 information for a new user device 315) update the public keys 350 and key ID values 360 stored locally at the application servers 325 across the system to support the application servers 325 locally validating user devices 315 without hitting the database 370.

The application server 325 may transmit a session identifier message 355 to the user device 315. The session identifier message 355 may include the private key 345 and either the key ID value 360 specific to the user device 315 (or to a user of the user device 315) or the certificate 365 encapsulating the public key 350. The certificate 365 may be associated with the public key 350 generated at the application server 325 by the key pair generator 330. In some cases, the certificate 365 may be associated with the user device 315 based on the generation and the association of the public-private key pair. The private key 345 may be stored in the memory of the user device 315 (e.g., in a secure enclave). As described in reference to FIGS. 1 and 2, this information received in the session identifier message 355 may be used by the user device 315 to establish a valid session with the database 370 (e.g., using a session establishment message).

In some cases, the application server 325 may store a local copy or a local indication of a certificate 365. The application server 325 may use this certificate 365 to revoke access for a user device 315. For example, the application server 325 may receive a revocation message indicating user device 315 (e.g., from administrator 305). The application server 325 may remove the local copy of the certificate 365 or the indication of the certificate 365 from memory. For example, in one specific example, the application server 325 may store a list of valid, issued certificates 365 (e.g., for verifying certificates 365 that are received from user devices 315). The application server 325 may remove a certificate 365 from the list of valid certificates stored in persistent memory 340 based on a received revocation message. If the application server 325 receives any future session identifier messages 355 containing this certificate 365, the application server 325 may refrain from establishing a connection with database 370 based this certificate 365 no longer being stored as a valid, issued certificate.

Figure 4:
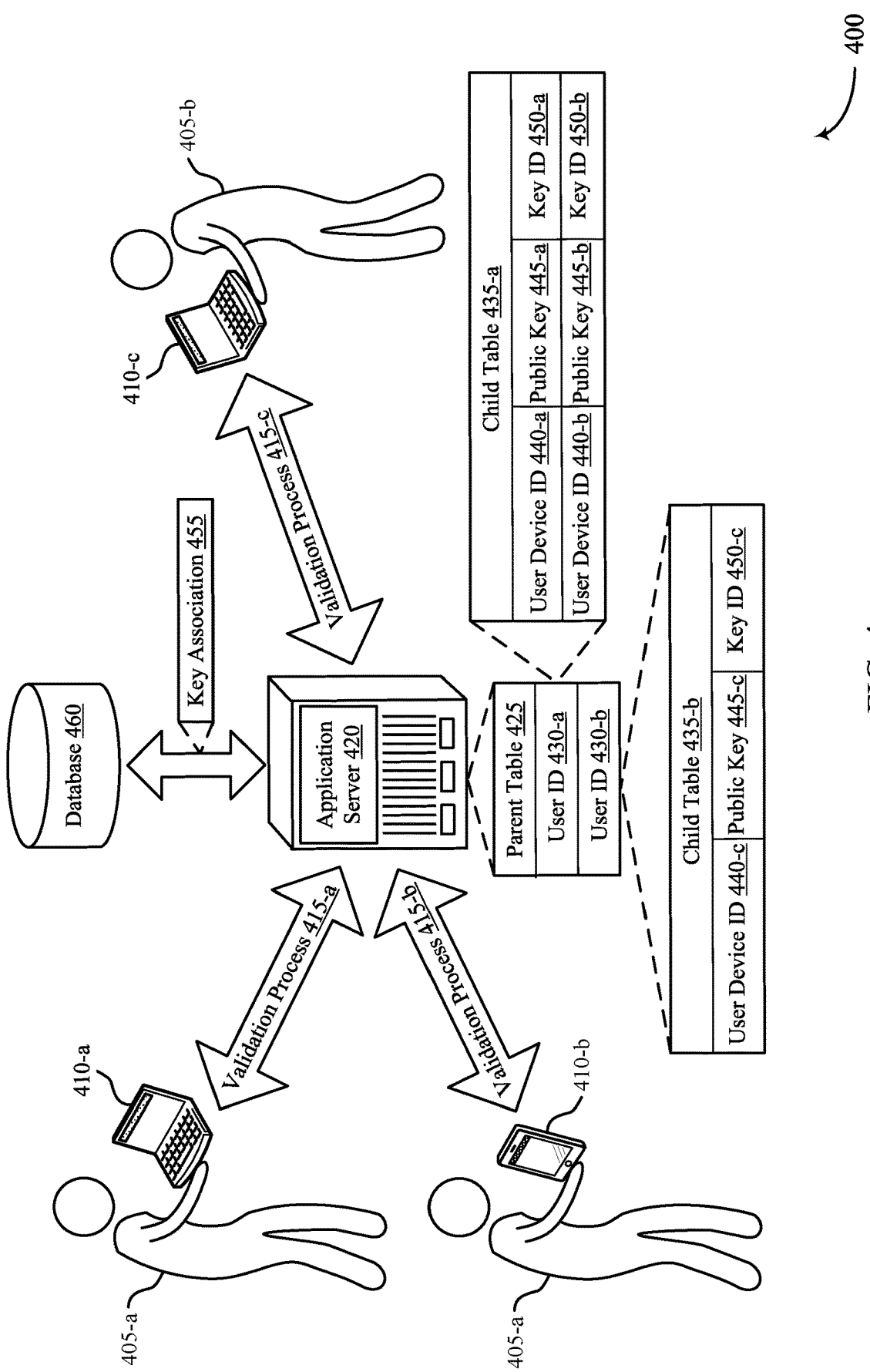

FIG. 4 illustrates an example of a system 400 that supports user device validation at an application server in accordance with aspects of the present disclosure. The system 400 may include a user 405, a user device 410, an application server 420, and a database 460, which may be examples of the corresponding devices described with respect to FIGS. 1 through 3. The system 400 may illustrate one possible implementation of user device information storage at an application server 420 that supports user device validation at the application server 420. However, it is to be understood that many other possible storage frameworks may be implemented to support user device validation at the application server 420.

The user 405-a may be associated with one or more user devices 410. For example, the user 405-a may be associated with (e.g., operate) the user device 410-a and the user device 410-b, where the user device 410-a and the user device 410-b are different devices (e.g., a laptop and a smart phone, two different smart phones, etc.). The user 405-b may be associated with the user device 410-c, where the user device 410-c is different from the user device 410-a and the user device 410-b. For example, each user device 410-a, 410-b, and 410-c may include a distinct and unique user device identification number (e.g., a user device ID 440). Additionally, each user device 410 may be associated with a different internet protocol (IP) address within a network. In some cases, each user 405-a and 405-b may be associated with a distinct and unique user identifier (e.g., name, identification number, password, etc.). The user identifier may be associated with the corresponding user device identification number.

In some cases, the user 405-a may request to establish a session with the database 460 via the user device 410-a. To verify whether the user device 410-a may access data in the database 460, the application server 420 may perform a validation process 415-a between the user device 410-a and the application server 420. The user device 410-a may transmit a session establishment message to the application server 420. This session establishment message may include a key ID 450-a associated with the user device 410-a and may be generated based on a private key associated with the user device 410-a. The user device 410-a may have received this private key and key ID 450-a during an initialization process when the user device 410-a or user 405-a was designated as a valid user device or user for accessing data at the database 460 (e.g., as discussed above with reference to FIGS. 2 and 3).

In some cases, the application server 420 may receive an API call (e.g., a session establishment message) from a user device 410, triggering a validation process 415. For example, the API call may request data resources to retrieve from the database 460, data records to modify in the database 460, or data to store in the database 460. The application server 420 may perform the validation process 415 to validate that the transmitting user device 410 can access the database 460, and may process the API call for the user device 410 based on establishing the connection with the database 460. In other cases, the validation process 415 may involve an mTLS procedure. For example, the application server 420 may transmit a server certificate to the user device 410 to validate the identity of the server, and the user device 410 may transmit a client certificate (e.g., a session establishment message) to the application server 420 to validate the identity of the user device 410. Validating the identity of the user device 410 in this mTLS procedure may involve the application server 420 verifying information in the client certificate against the information stored in the parent table 425 and child tables 435.

For example, if the application server 420 receives a session establishment message (e.g., signed by a private key and containing a key ID 450-b) from a user device 410-b associated with a user 405-a, the application server 420 may search a parent table 425 for a user ID 430 corresponding to the user 405-a (e.g., user ID 430-a). The application server 420 may then identify the child table 435-a corresponding to (e.g., linked to) the user ID 430-a, and may search the child table 435-a for the key ID 450-b received in the session establishment message, and may identify the corresponding public key 445-b. This key ID 450-b and public key 445-b may be associated with a user device ID 440-b for the user device 410-b that transmitted the session establishment message. The application server 430 may utilize the identified public key 445-b to validate the private key used to sign the session establishment message in a validation process 415-b. If public key 445-b and the private key used to sign the message form a valid public-private key pair, then the user device 410-b—and the associated user 405-a—may be validated, and allowed to access records in the database 460.

In some cases, the application server 420 may receive a session establishment message that is based on a private key of a public-private key pair or that indicates a key ID 450 not in the local memory of the application server 420. For example, the corresponding public key 445, the key ID 450, or both may not be stored in the memory (e.g., a child table 435) of the application server 420. In some examples, this may be due to the application server 420 receiving a cache-flushing command based on the amount of available storage in the memory of the application server 420. In other examples, the application server 420 may remove a public key 445 or a key ID 450 associated with the public key 445 after a pre-determined or dynamic period of time (e.g., as defined by a TTL value corresponding to the public key 445 or the key ID 450). For example, a public key 445 may be assigned a duration of time where the public key 445 remains active in the memory of the application server 420. If the application server 420 does not receive a key ID 450 (e.g., in a session establishment message) associated with the public key 445 within the duration of time, the public key 445 may be removed from the memory of the application server 420. In these cases, the application server 420 may retrieve the key association 455 between the public key 445 and the key ID 450 from the database 460 if the application server 420 receives session establishment messages with the key ID 450 after removing the association from local memory. The application server 420 may store the key association 455 between the public key and the key ID in local memory upon retrieval from the database 460.

Figure 5:
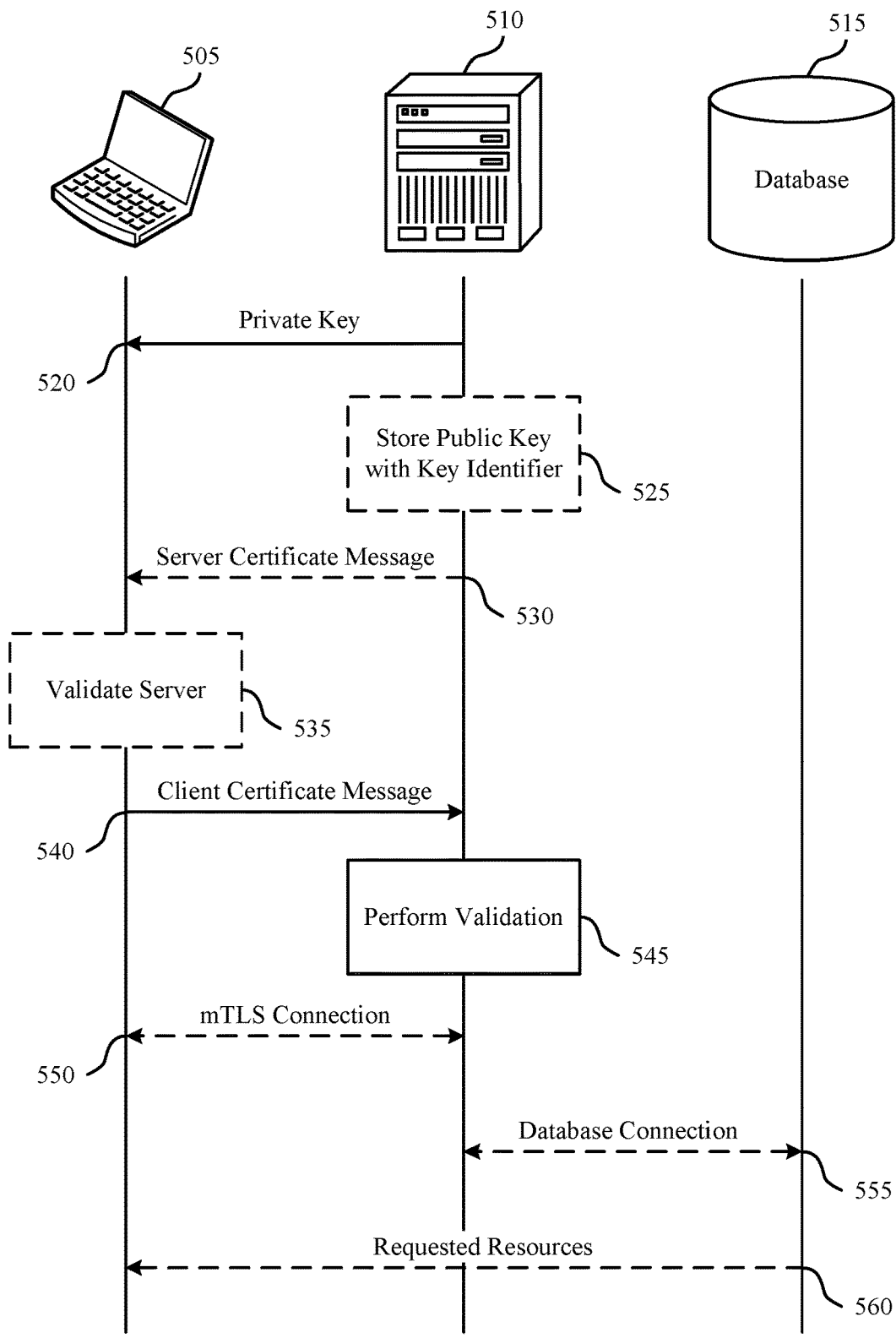
FIGS. 5 and 6 illustrate examples of process flows that support user device validation at an application server in accordance with aspects of the present disclosure.

FIG. 5 illustrates an example of a process flow 500 that supports user device validation at an application server in accordance with aspects of the present disclosure. The process flow 500 may include a user device 505, an application server 510, and a database 515. The user device 505, the application server 510, and the database 515 may be examples of the corresponding devices described with respect to FIGS. 2 through 4. Alternative examples of the following may be implemented, where some steps are performed in a different order than described or not performed at all. In some cases, steps may include additional features not mentioned below, or further steps may be added.

At 520, the application server 510 may transmit a private key and a public key identifier (e.g., a certificate or a key ID value) to the user device 505. The private key may be an example of a private key of a public-private key pair. For example, the private key may be associated with a public key stored in the memory of the application server 510.

In some cases, at 525, the application server 510 may store an association between the public key of the public-private key pair and the key ID value locally at the application server 510. In some cases, the association may be stored in the memory (e.g., a persistent memory cache) of the application server 510. In some cases, the application server 510 may additionally store a key identifier indicating the public-private key pair for a specific user or user device. In other cases, the application server 510 may store the certificate locally for revocation purposes.

At 530, the application server 510 may transmit a server certificate message (e.g., as part of a transport layer security (TLS) handshake protocol). This server certificate message may be an example of a digital X.509 certificate. The user device 505 may verify that the server certificate message corresponds to a trusted application server 510. For example, the user device 505 may contain a list of the application servers 510 serving the database 515 as components of the database system, and may terminate the validation procedure if the server certificate message does not indicate one of the application servers 510 of the database system. In some cases, the user device 505 may request the server certificate message from the application server 510. The server certificate message may include a signature which ensures that the application server 510 generated the server certificate message without any server or entity modifying the message prior to or during transmission to the user device 505. In some cases, the server certificate message may include a list of root certificate names trusted by the application server 510. The server certificate message may also include a request for the user device 505 to transmit a client-side certificate (e.g., a client certificate message).

At 535, the user device 505 may validate the application server 510 based on receiving the server certificate message. The user device 505 may verify that the application server 510 transmitted the server certificate message without modification. In some cases, the user device 505 may verify the server certificate message by using one or more pre-trusted root certificates. In some cases, the user device 505 may authenticate the application server 510. For example, the user device 505 may recognize the identity of the application server 510 as a trusted server in the database system.

At 540, the user device 505 may transmit a client certificate message to the application server 510 (e.g., to continue the TLS handshake protocol). The client certificate message may be an example of a session establishment message. The client certificate message may include one or more certificates, and may be based on the private key. For example, the client certificate message may include the certificate received at 520, a certificate generated by the user device 505, a certificate associated with a name from the list of names of root certificates included in the server certificate message, or any combination of these certificates. In some examples, the client certificate message may be generated by the user device 505 using the private key, and/or may contain a key ID value received at 520. For example, the client certificate message may be encrypted using the private key or may be signed by the private key.

At 545, the application server 510 may validate that the client certificate message (e.g., the session establishment message) is received from a trusted user device 505. In some cases, the application server 510 may validate the user device 505 based on identifying the public key corresponding to the private key. For example, if the client certificate message contains a certificate, the application server 510 may identify (e.g., derive, extract, etc.) the public key from the certificate. If the client certificate message contains a key ID value, the application server 510 may identify a public key stored at the application server 510 and associated with the key ID value. The application server 510 may validate the user device 505 using the identified public key. For example, the application server 510 may validate that both the certificate included in the client certificate message and the private key used to generate the client certificate message match a same valid user device 505.

At 550, the application server 510 may establish a trusted mTLS connection with the user device 505. For example, the server certificate message and the client certificate message may be steps in an mTLS procedure between the application server 510 and the user device 505. In this example, the user device 505 may verify the identity of the application server 510, and the application server 510 may verify the identity of the user device 505. Establishing the mTLS connection at the application server 510 may associate the certificate received at the application server 510 with the private key stored at the user device 505. In some cases, the user device 505 may be identified as a user device associated with a tenant of the database 515 based on the mTLS connection. The mTLS connection may be an example of a secure, encrypted channel between the user device 505 and the application server 510.

At 555, the application server 510 may establish a database connection with the database 515 of the database system in response to the application server 510 validating the user device 505. The application server 510 may use the database connection for handling resource requests for the user device 505. For example, the user device 505 may transmit resource requests to the database 515 (e.g., via the application server 510) using the established mTLS connection and the established database connection. The application server 510 may receive a resource request from the validated user device 505, and may forward the resource request to the database 515. At 560, the database 515 may transmit the requested resources to the user device 505 (e.g., via the application server 510 using the database connection and the mTLS connection) based on establishing the database connection.

Figure 6:
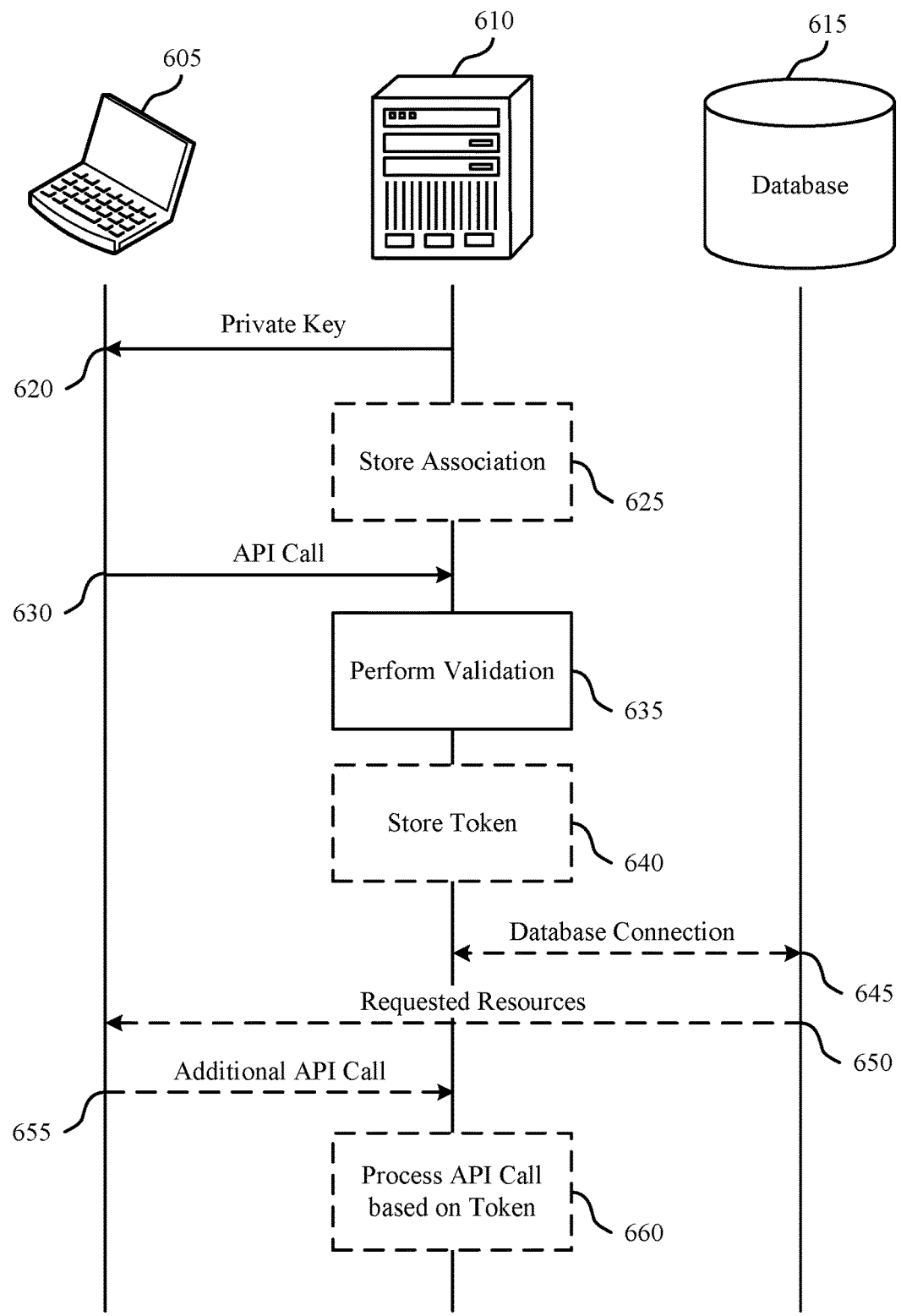

FIG. 6 illustrates an example of a process flow 600 that supports user device validation at an application server in accordance with aspects of the present disclosure. The process flow 600 may include a user device 605, an application server 610, and a database 615. The user device 605, the application server 610, and the database 615 may be examples of the corresponding devices described with respect to FIGS. 2 through 5. Alternative examples of the following may be implemented, where some steps are performed in a different order than described or not performed at all. In some cases, steps may include additional features not mentioned below, or further steps may be added.

At 620, the application server 610 may transmit a private key and a public key identifier (e.g., a certificate or a key ID value) to the user device 605. The private key may be an example of a private key of a public-private key pair. For example, the private key may be associated with a public key stored in the memory of the application server 610 or encapsulated within a certificate. At 625, the application server 610 may store an association between the public key of the public-private key pair and a key ID value in memory (e.g., a persistent memory cache) of the application server 610.

At 630, the application server 610 may receive an API call from the user device 605. In some cases, the application server 610 may identify whether the application server 610 contains a session token stored locally that is associated with the user device 605. If not, the application server 610 may use the API call as a session establishment message. In some cases, the API call may be signed by the private key transmitted to the user device 605, and may indicate either the certificate or the key ID value. For example, the API call may include the certificate or a key identifier in a header of the API call, and the header of the API call may be signed by the private key.

At 635, the application server 610 may validate that the API call (e.g., the session establishment message) is received from the user device 605. In some cases, the application server 610 may validate the user device 605 based on the stored association between the public key and the key ID value, or based on a certificate included in the API call. For example, if the header of the API call is signed by the private key corresponding to the public key stored in the memory of the application server 610 and associated with the key ID value, or if the API call is signed by the private key corresponding to the public key contained in a certificate included in the header of the API call (e.g., based on a public-private key pair), then the application server 610 may validate the user device 605. If the header does not include this identification information, the application server 610 may not validate the user device 605 until receiving an API call with this information included in the header (e.g., if the user device 605 periodically transmits API calls with the certificate and/or key ID and signed by the private key). In some cases, the application server 610 may send a request to the user device 605 for this information in a subsequent API call.

At 640, if the user device 605 passes the validation process, the application server 610 may store a session token based on validating that the API call is received from the user device 605. In some cases, the user device 605 may be assigned a single session token. The session token may be stored in the memory of the application server 610 and may be associated with the user device 605, the public key, the public-private key pair, or some combination of these. In some examples, the stored session token may be an example of an elliptic-curve-based key.

At 645, the application server 610 may establish a database connection with the database 615 of the database system in response to the application server 610 validating the user device 605. The application server 610 may forward the API call to the database 615 or may perform data retrieval specified by the API call using the established database connection. At 650, the database 615 may transmit the resources requested in the API call to the user device 605 based on establishing the database connection. In some cases, the application server 610 may modify the resource requests forwarded to the database 615. For example, if the user device 605 is associated with a tenant of the database

615, the application server 610 may automatically modify the API call to only access data in the database 615 owned by the specific tenant.

At 655, the application server 610 may receive one or more additional API calls from the user device 605. At 660, the additional API calls may be processed based on the session token. For example, the application server 610 may identify that the API calls are received from the user device 605, and may identify the session token stored in memory for the user device 605. Based on the session token in memory, the application server 610 may process the API call as if the user device 605 has been validated. In some cases, the application server 610 may periodically re-validate the user device 605. For example, for additional received API calls at regular or irregular intervals received from the user device 605, the application server 610 may validate the API calls based on the public-private key pair and the public key identifier. The session token may include a TTL value corresponding to a duration of time where the application server 610 may validate the API call without verifying that the header is signed by the private key and includes the certificate or key ID value. The TTL value of the session token may be updated in the memory of the application server 610 based on the periodic validation.

For example, in one specific case, the application server 610 may authenticate additional API calls using the stored session token for one hour (e.g., the TTL value of the session token is set to one hour). If the application server 610 receives an API call from the user device 605 within the one hour time window, then the API call may pass validation without the application server 610 checking the header of the API call. In some cases, the session token may be updated based on the TTL value. For example, if the TTL value of the session token expires, the user device 605 may remove the session token from memory and may validate whether the next API call received from the user device 605 contains a header including the certificate/key ID value and is signed by the private key. If so, the application server 610 may store a new session token in memory associated with the user device 605 and a new TTL value. In some cases, the session token may be updated before the TTL value of the session token expires. For example, if the session token expires in one hour, the application server 610 may begin attempting to validate API calls after thirty minutes. If the user device 605 periodically includes the certificate/key ID value and signs the header with the private key every ten minutes, the application server 610 may re-validate the user device 605 prior to expiration of the session token, and may store a new session token in memory or may update the existing session token with an updated TTL value based on the re-validation (e.g., a fresh hour-long valid window for API calls from the user device 605).

In some cases, the database system may assign a same application server 610 to process API calls from a same user device 605 to maximize the usefulness of the session tokens. For example, if API calls from the same user device 605 are handled by multiple servers, each of these applications servers 610 may maintain separate caches of session tokens, and may need to spend more processing resources to periodically re-validate the user device 605 and update the locally stored session token. By tunneling API calls from one user device 605 to a single application server 610, the database system may efficiently maintain a single session token for the user device 605 and accordingly improve the efficiency of the database system. However, if traffic from a user device 605 exceeds a certain threshold, the database system may distribute the API calls for that user device 605 across multiple application servers 610 (e.g., to minimize bottlenecking in the cases of a user device 605 generating a disproportionate amount of database traffic).

Figure 7:
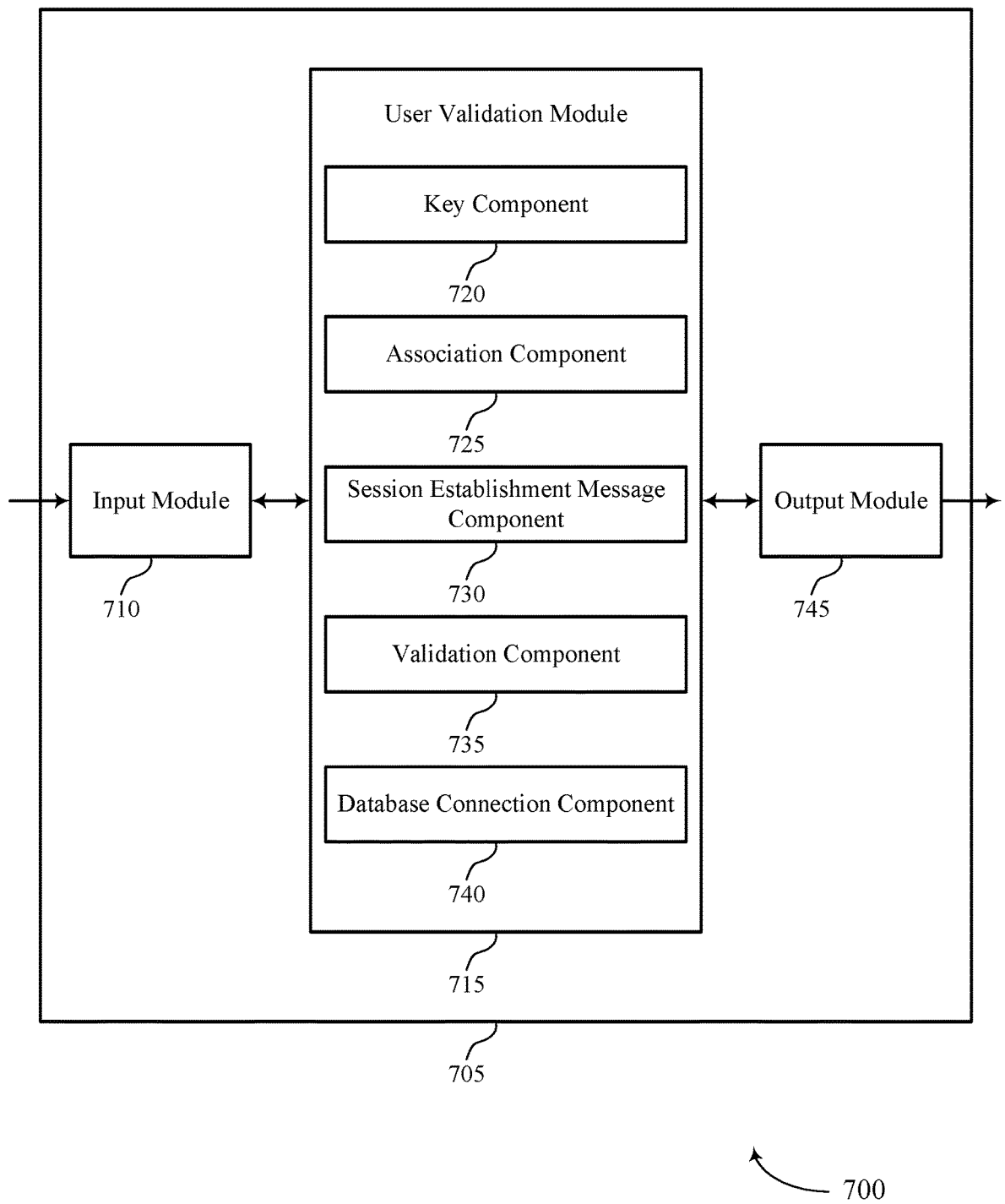
FIG. 7 shows a block diagram of an apparatus that supports user device validation at an application server in accordance with aspects of the present disclosure.

FIG. 7 shows a block diagram 700 of an apparatus 705 that supports user device validation at an application server in accordance with aspects of the present disclosure. The apparatus 705 may include an input module 710, a user validation module 715, and an output module 745. The apparatus 705 may also include a processor. Each of these components may be in communication with one another (e.g., via one or more buses). In some cases, the apparatus 705 may be an example of an application server, a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the user validation module 715 to support user device validation at an application server. In some cases, the input module 710 may be a component of an input/output (I/O) controller 915 as described with reference to FIG. 9.

The user validation module 715 may include a key component 720, an association component 725, a session establishment message component 730, a validation component 735, and a database connection component 740. The user validation module 715 may be an example of aspects of the user validation module 805 or 910 described with reference to FIGS. 8 and 9.

The user validation module 715 and/or at least some of its various sub-components may be implemented in hardware, software executed by a processor, firmware, or any combination thereof. If implemented in software executed by a processor, the functions of the user validation module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The user validation module 715 and/or at least some of its various sub-components may be physically located at various positions, including being distributed such that portions of functions are implemented at different physical locations by one or more physical devices. In some examples, the user validation module 715 and/or at least some of its various sub-components may be a separate and distinct component in accordance with various aspects of the present disclosure. In other examples, the user validation module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The key component 720 may transmit, from the application server and to a user device, a private key of a public-private key pair and a public key identifier indicating a public key of the public-private key pair. In some cases, the association component 725 may store, in memory of the application server, an association between the public key of the public-private key pair and a certificate, the private key, or both. The session establishment message component 730 may receive a session establishment message that is based on the private key and that comprises the public key identifier. The key component 720 may also determine the public key of the public-private key pair based on the received public key identifier. The validation component 735 may validate, at the application server, that the session establishment message is received from the user device based on the private key and the determined public key. The database connection component 740 may establish a database connection with a database of a database system in response to the validating.

The output module 745 may manage output signals for the apparatus 705. For example, the output module 745 may receive signals from other components of the apparatus 705, such as the user validation module 715, and may transmit these signals to other components or devices. In some specific examples, the output module 745 may transmit output signals for display in a user interface, for storage in a database or data store, for further processing at a server or server cluster, or for any other processes at any number of devices or systems. In some cases, the output module 745 may be a component of an I/O controller 915 as described with reference to FIG. 9.

Figure 8:
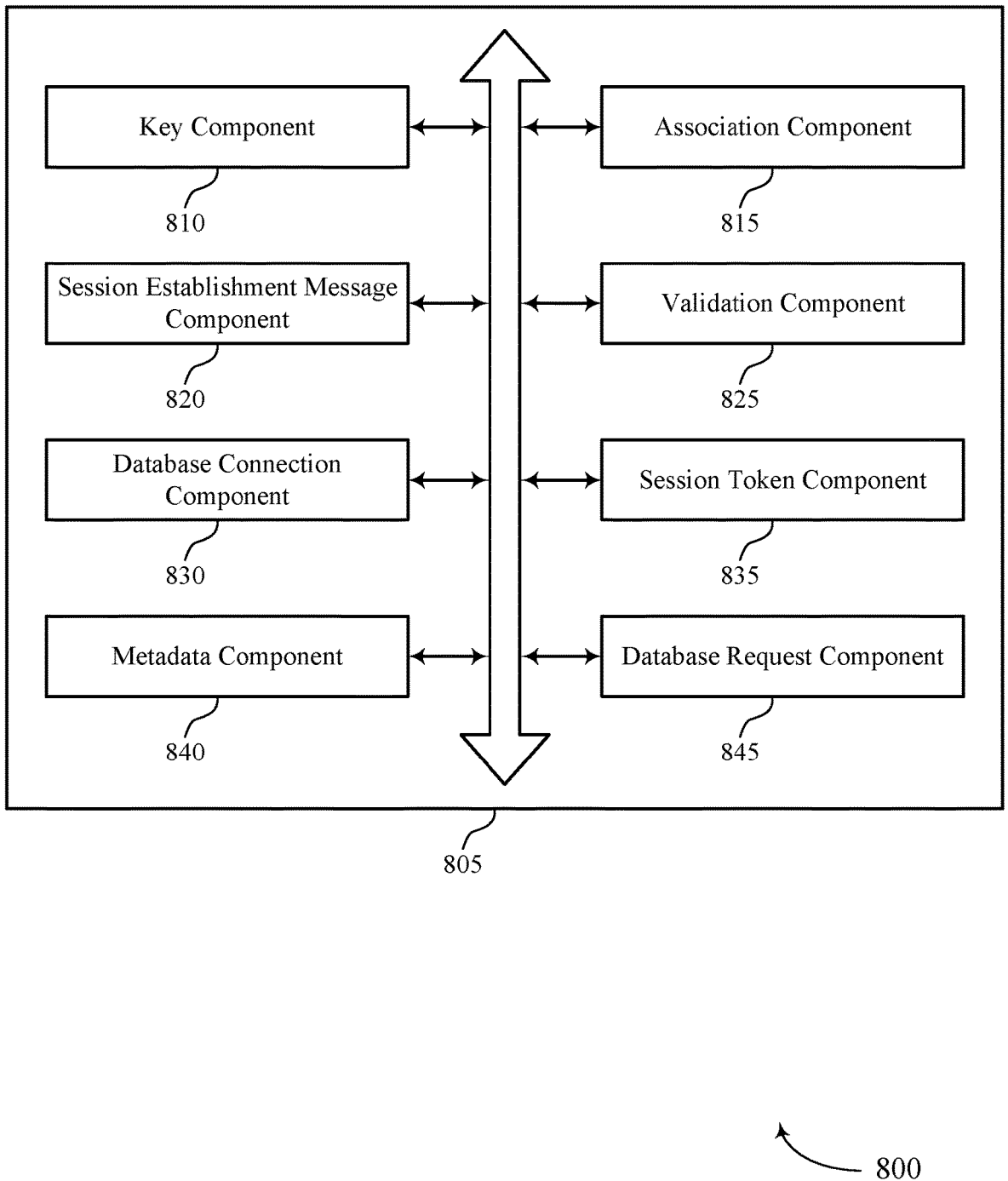
FIG. 8 shows a block diagram of a user validation module that supports user device validation at an application server in accordance with aspects of the present disclosure.

FIG. 8 shows a block diagram 800 of a user validation module 805 that supports user device validation at an application server in accordance with aspects of the present disclosure. The user validation module 805 may be an example of aspects of a user validation module 715 or a user validation module 910 described herein. The user validation module 805 may include a key component 810, an association component 815, a session establishment message component 820, a validation component 825, a database connection component 830, a session token component 835, a metadata component 840, and a database request component 845. Each of these modules may communicate, directly or indirectly, with one another (e.g., via one or more buses). In some case, the user validation module 805 may be a component of an application server within a database system.

The key component 810 may transmit, from the application server and to a user device, a private key of a public-private key pair and a public key identifier indicating a public key of the public-private key pair. In some examples, the key component 810 may generate, at the application server, the public-private key pair associated with the user device. In some examples, the key component 810 may receive a single-use token, where generating the public-private key pair is triggered by receiving the single-use token. This single-use token may be received from a user device, or from another application server on premises with the application server or communicating with the application server via the cloud. In some cases, the private key of the public-private key pair is stored in volatile memory of the application server. In some cases, the public key of the public-private key pair is stored in persistent memory and cached on the application server. The key component 810 may determine the public key of the public-private key pair based on the received public key identifier.

In some examples, the public key identifier may comprise a certificate, and determining the public key of the public-private key pair may be based on the received public key identifier. The key component 810 may determine that the certificate was issued by an entity associated with the database system. In some examples, the key component 810 identify an encapsulated public key of the certificate, where the encapsulated public key comprises the public key of the public-private key pair.

In some examples, the key component 810 may store, in memory of the application server, the certificate, receive an access revocation message for the user device, transmit, to the database of the database system, a deletion command for the user device based on the stored certificate, and remove, from the memory of the application server, the certificate.

The association component 815 may store, in memory of the application server, an association between the public key of the public-private key pair and a key ID value, where determining the public key of the public-private key pair may be based on the received public key identifier. In some examples, the public key identifier may comprises the key ID value. In some examples, storing the association between the public key of the public-private key pair and the key ID value may comprise the association component 815 identifying the public key of the public-private key pair based on the received key ID value. In some examples, validating that the session establishment message is received from the user device may comprise the association component 815 identifying, in the memory of the application server, one or more associations between public keys and key ID values corresponding to the identified user, where the one or more associations includes the stored association between the public key and the key ID values for the user device. In some examples, the association component 815 may identify the stored association between the public key and the key ID value according to the received key ID value.

In some examples, the association component 815 may transmit, to the database of the database system, an indication of the association between the public key and the key ID value. In some examples, the association component 815 may remove the association between the public key and the key ID value from the memory of the application server based on a TTL value, a cache-flushing command, or a combination thereof. In some examples, the association component 815 may determine that the association between the public key and the key ID value is not stored in the memory of the application server. In these examples, the association component 815 may retrieve, from the database of the database system, the association between the public key and the key ID value based on the transmitted indication. The association component 815 may store, in the memory of the application server, the association between the public key and the key ID value. In some cases, the association component 815 may receive an access revocation message for the user device, transmit, to the database of the database system, a deletion command for the association between the public key and the key ID value stored in the database based on the access revocation message, and invalidate a cache of the application server based on the access revocation message, where the cache of the application server stores the association between the public key and the key ID value.

The session establishment message component 820 may receive a session establishment message that is based on the private key and that comprises the public key identifier.

In some examples, the session establishment message may comprise a client certificate message in an mTLS procedure. In that case, the session establishment message component 820 may establish a trusted mTLS connection between the application server and the user device based on the validating. In some cases, the client certificate message comprises the certificate and is generated by the user device using the private key.

In some examples, the session establishment message may comprise an API call, where validating that the session establishment message is received from the user device may comprise the session establishment message component 820 identifying that the session establishment message is signed by the private key corresponding to the determined public key. In some cases, a header of the API call comprises the public key identifier and is signed by the private key.

In some examples, the session establishment message component 820 may periodically validate, at the application server, that an additional session establishment message is received from the user device. In some examples, the session establishment message component 820 may receive an additional session establishment message that is based on the private key and that comprises the key ID value.

The validation component 825 may validate, at the application server, that the session establishment message is received from the user device based on the private key and the determined public key. In some examples, validating that the session establishment message is received from the user device may comprise the validation component 825 validating the private key using the public key of the stored association between the public key and the key ID value.

The database connection component 830 may establish a database connection with a database of the database system in response to the validating.

The session token component 835 may store, in the memory of the application server, a session token based on validating that the session establishment message is received from the user device. In some examples, the session token component 835 may process any additional API calls for the user device based on the session token. In some examples, the session token component 835 may update a TTL value for the session token in the memory of the application server based on the periodic validation.

In some cases, validating that the session establishment message is received from the user device may comprise the metadata component 840 extracting metadata from the key ID value. In some examples, the metadata component 840 may determine a user based on the metadata. In some cases, the metadata includes a tenant identifier, a user identifier, a user device identifier, or a combination thereof.

The database request component 845 may receive, from the user device, an API call requesting access to the database of the database system. In some examples, the database request component 845 may process the API call for the user device based on the established database connection.

Figure 9:
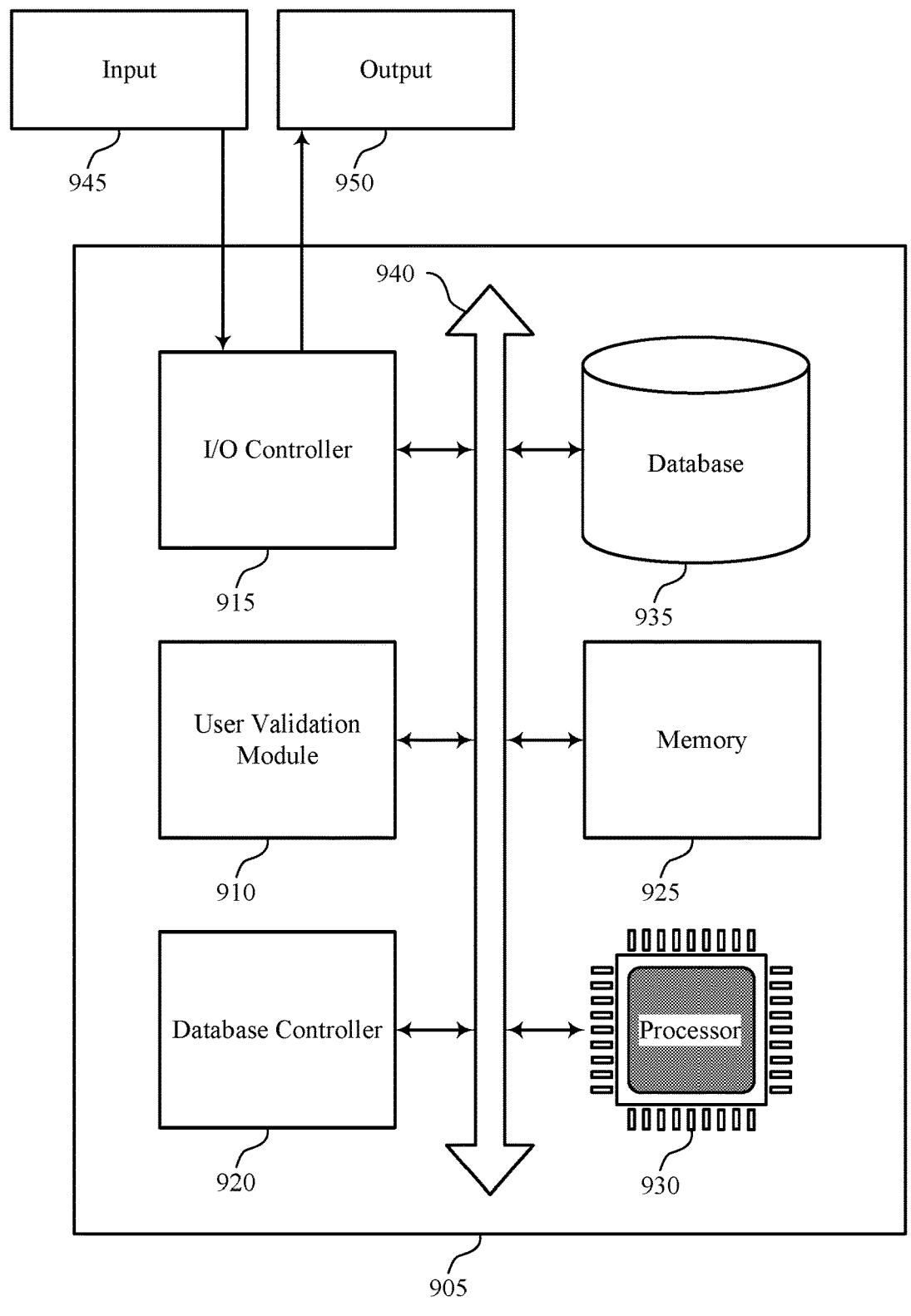
FIG. 9 shows a diagram of a system including a device that supports user device validation at an application server in accordance with aspects of the present disclosure.

FIG. 9 shows a diagram of a system 900 including a device 905 that supports user device validation at an application server in accordance with aspects of the present disclosure. The device 905 may be an example of or include the components of an application server or an apparatus 705 as described herein. The device 905 may include components for bi-directional data communications including components for transmitting and receiving communications, including a user validation module 910, an I/O controller 915, a database controller 920, memory 925, a processor 930, and a database 935. These components may be in electronic communication via one or more buses (e.g., bus 940).

The user validation module 910 may be an example of a user validation module 715 or 805 as described herein. For example, the user validation module 910 may perform any of the methods or processes described above with reference to FIGS. 7 and 8. In some cases, the user validation module 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include RAM and read-only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting user device validation at an application server).

Figure 10:
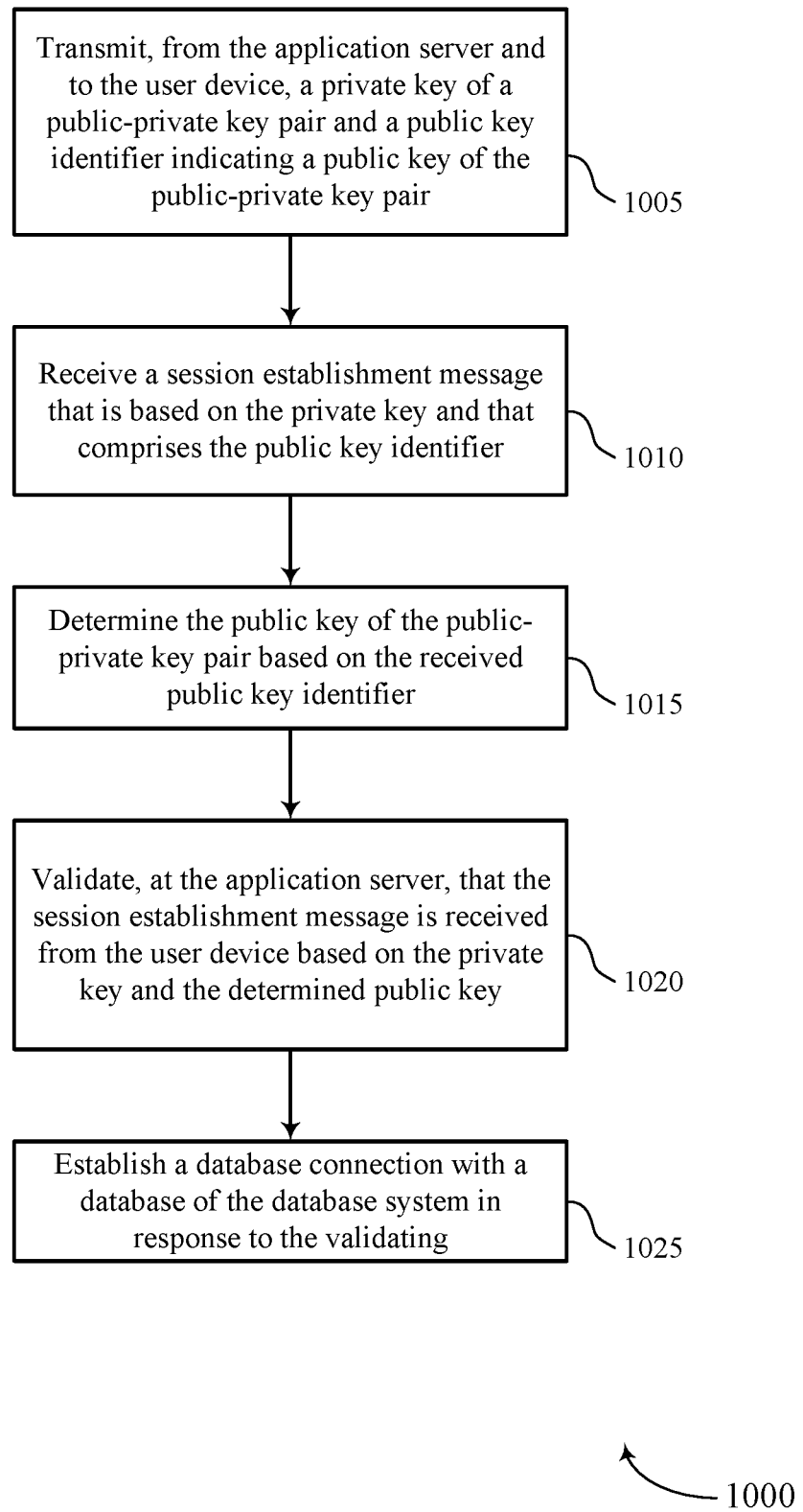
FIGS. 10 through 12 show flowcharts illustrating methods that support user device validation at an application server in accordance with aspects of the present disclosure.

FIG. 10 shows a flowchart illustrating a method 1000 that supports user device validation at an application server in accordance with aspects of the present disclosure. The operations of method 1000 may be implemented by an application server or its components as described herein. For example, the operations of method 1000 may be performed by a user validation module as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1005, the application server may transmit, to a user device, a private key of a public-private key pair and a public key identifier indicating a public key of the public-private key pair. The operations of 1005 may be performed according to the methods described herein. In some examples, aspects of the operations of 1005 may be performed by a key component as described with reference to FIGS. 7 through 9.

At 1010, the application server may receive a session establishment message that is based on the private key and that comprises the public key identifier. The operations of 1010 may be performed according to the methods described herein. In some examples, aspects of the operations of 1010 may be performed by a session establishment message component as described with reference to FIGS. 7 through 9.

At 1015, the application server may determine the public key of the public-private key pair based on the received public key identifier. The operations of 1015 may be performed according to the methods described herein. In some examples, aspects of the operations of 1015 may be performed by a session establishment message component as described with reference to FIGS. 7 through 9.

At 1020, the application server may validate, at the application server, that the session establishment message is received from the user device based on the private key and the determined public key The operations of 1020 may be performed according to the methods described herein. In some examples, aspects of the operations of 1020 may be performed by a validation component as described with reference to FIGS. 7 through 9.

At 1025, the application server may establish a database connection with a database of the database system in response to the validating. The operations of 1025 may be performed according to the methods described herein. In some examples, aspects of the operations of 1025 may be performed by a database connection component as described with reference to FIGS. 7 through 9.

Figure 11:
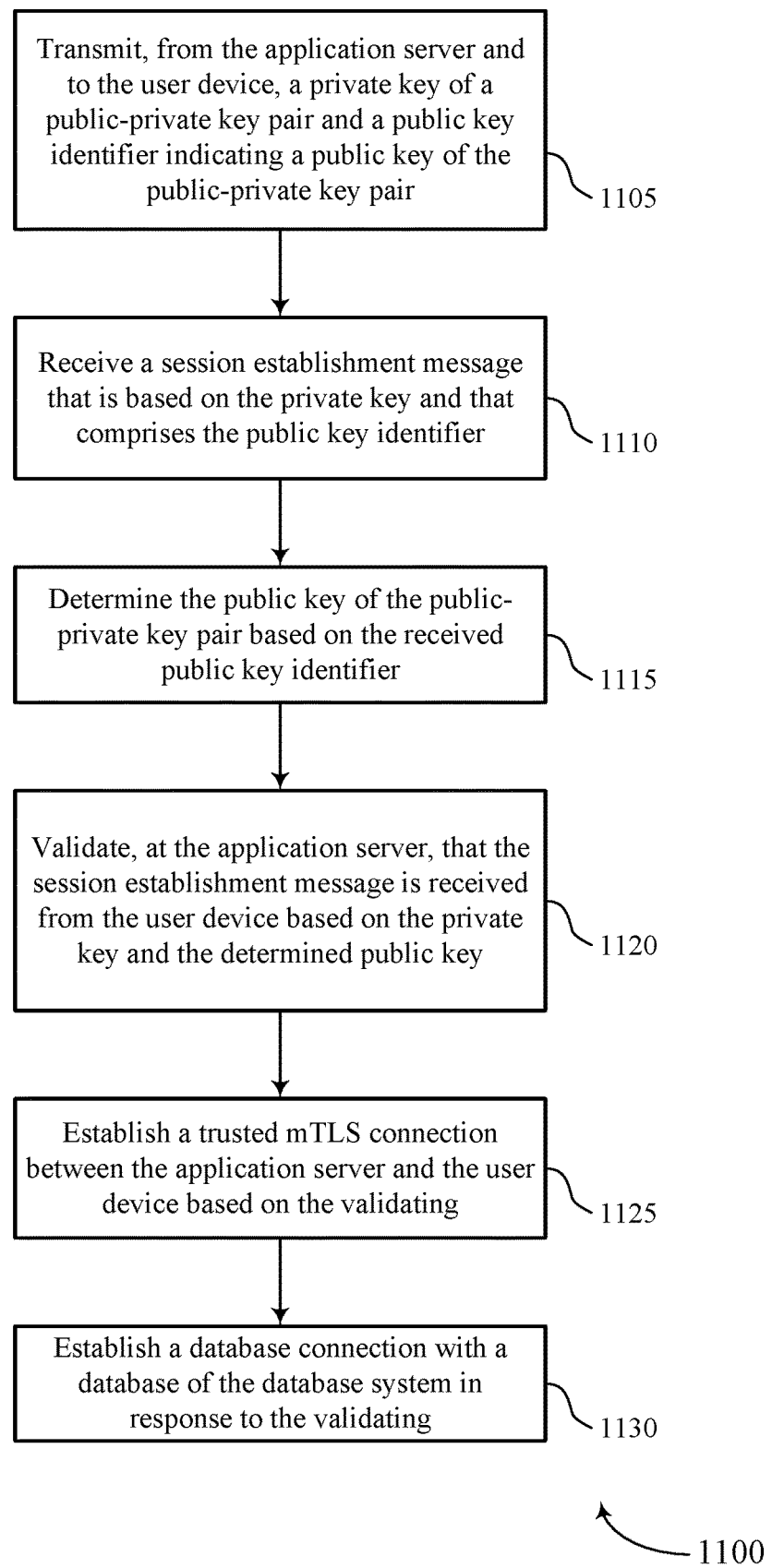

FIG. 11 shows a flowchart illustrating a method 1100 that supports user device validation at an application server in accordance with aspects of the present disclosure. The operations of method 1100 may be implemented by an application server or its components as described herein. For example, the operations of method 1100 may be performed by a user validation module as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1105, the application server may transmit, to a user device, a private key of a public-private key pair and a public key identifier indicating a public key of the public-private key pair. The operations of 1105 may be performed according to the methods described herein. In some examples, aspects of the operations of 1105 may be performed by a key component as described with reference to FIGS. 7 through 9.

At 1110, the application server may receive a session establishment message that is based on the private key and that comprises the public key identifier. The operations of 1110 may be performed according to the methods described herein. In some examples, aspects of the operations of 1110 may be performed by a session establishment message component as described with reference to FIGS. 7 through 9.

At 1115, the application server may determine the public key of the public-private key pair based on the received public key identifier. The operations of 1115 may be performed according to the methods described herein. In some examples, aspects of the operations of 1115 may be performed by a session establishment message component as described with reference to FIGS. 7 through 9.

At 1120, the application server may validate, at the application server, that the session establishment message is received from the user device based on the private key and the determined public key. The operations of 1120 may be performed according to the methods described herein. In some examples, aspects of the operations of 1120 may be performed by a validation component as described with reference to FIGS. 7 through 9.

In some cases, the session establishment message may comprise a client certificate message in an mTLS procedure. In these cases, at 1125, the application server may establish a trusted mTLS connection between the application server and the user device based on the validating. The operations of 1125 may be performed according to the methods described herein. In some examples, aspects of the operations of 1125 may be performed by a session establishment message component as described with reference to FIGS. 7 through 9.

At 1130, the application server may establish a database connection with a database of the database system in response to the validating. The operations of 1130 may be performed according to the methods described herein. In some examples, aspects of the operations of 1130 may be performed by a database connection component as described with reference to FIGS. 7 through 9.

Figure 12:
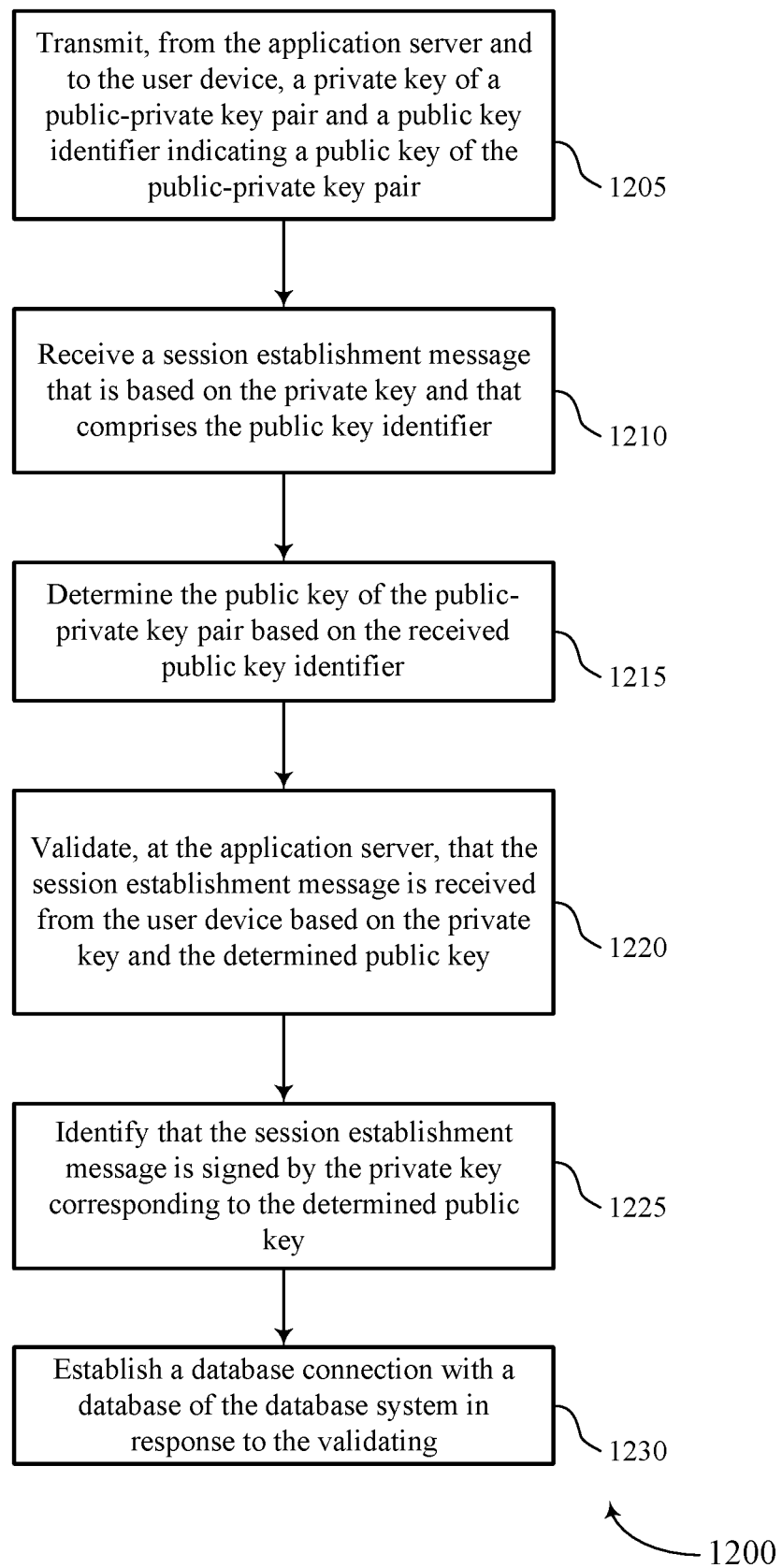

FIG. 12 shows a flowchart illustrating a method 1200 that supports user device validation at an application server in accordance with aspects of the present disclosure. The operations of method 1200 may be implemented by an application server or its components as described herein. For example, the operations of method 1200 may be performed by a user validation module as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1205, the application server may transmit, to a user device, a private key of a public-private key pair and a public key identifier indicating a public key of the public-private key pair. The operations of 1205 may be performed according to the methods described herein. In some examples, aspects of the operations of 1205 may be performed by a key component as described with reference to FIGS. 7 through 9.

At 1210, the application server may receive a session establishment message that is based on the private key and that comprises the public key identifier. The operations of 1210 may be performed according to the methods described herein. In some examples, aspects of the operations of 1210 may be performed by a session establishment message component as described with reference to FIGS. 7 through 9.

At 1215, the application server may determine the public key of the public-private key pair based on the received public key identifier. The operations of 1215 may be performed according to the methods described herein. In some examples, aspects of the operations of 1215 may be performed by a session establishment message component as described with reference to FIGS. 7 through 9.

At 1220, the application server may validate, at the application server, that the session establishment message is received from the user device based on the private key and the determine public key. The operations of 1220 may be performed according to the methods described herein. In some examples, aspects of the operations of 1220 may be performed by a validation component as described with reference to FIGS. 7 through 9.

In some cases, the session establishment message may comprise an API call. In these cases, validating that the session establishment message is received from the user device may include the application server, at 1225, identifying that the session establishment message is signed by the private key corresponding to the determined public key. The operations of 1225 may be performed according to the methods described herein. In some examples, aspects of the operations of 1225 may be performed by a session establishment message component as described with reference to FIGS. 7 through 9.

At 1230, the application server may establish a database connection with a database of the database system in response to the validating. The operations of 1230 may be performed according to the methods described herein. In some examples, aspects of the operations of 1230 may be performed by a database connection component as described with reference to FIGS. 7 through 9.

A method of user device validation at an application server of a database system is described. The method may include transmitting, from the application server and to the user device, a private key of a public-private key pair and a public key identifier indicating a public key of the public-private key pair, receiving a session establishment message that is based on the private key and that comprises the public key identifier, determining the public key of the public-private key pair based at least in part on the received public key identifier, validating, at the application server, that the session establishment message is received from the user device based on the private key and the determined public key, and establishing a database connection with a database of the database system in response to the validating.

An apparatus for user device validation at an application server of a database system is described. The apparatus may include a processor, memory in electronic communication with the processor, and instructions stored in the memory. The instructions may be executable by the processor to cause the apparatus to transmit, from the application server and to the user device, a private key of a public-private key pair and a public key identifier indicating a public key of the public-private key pair receive a session establishment message that is based on the private key and that comprises the public key identifier, determine the public key of the public-private key pair based at least in part on the received public key identifier, validate, at the application server, that the session establishment message is received from the user device based on the private key and the determined public key, and establish a database connection with a database of the database system in response to the validating.

Another apparatus for user device validation at an application server of a database system is described. The apparatus may include means for transmitting, from the application server and to the user device, a private key of a public-private key pair and a public key identifier indicating a public key of the public-private key pair receiving a session establishment message that is based on the private key and that comprises the public key identifier, determining the public key of the public-private key pair based at least in part on the received public key identifier, validating, at the application server, that the session establishment message is received from the user device based on the private key and the determined public key, and establishing a database connection with a database of the database system in response to the validating.

A non-transitory computer-readable medium storing code for user device validation at an application server of a database system is described. The code may include instructions executable by a processor to transmit, from the application server and to the user device, a private key of a public-private key pair and a public key identifier indicating a public key of the public-private key pair receive a session establishment message that is based on the private key and that comprises the public key identifier, determine the public key of the public-private key pair based at least in part on the received public key identifier, validate, at the application server, that the session establishment message is received from the user device based on the private key and the determined public key, and establish a database connection with a database of the database system in response to the validating.

In some examples of the method, apparatuses, and non-transitory computer-readable medium described herein, the public key identifier may comprise a certificate. In some examples of the method, apparatuses, and non-transitory computer-readable medium described herein determining the public key of the public-private key pair based at least in part on the received public key identifier may include operations, features, means, or instructions for determining that the certificate was issued by an entity associated with the database system and identifying an encapsulated public key of the certificate, wherein the encapsulated public key comprises the public key of the public-private key pair.

These examples of the method, apparatuses, and non-transitory computer-readable medium described herein may further include operations, features, means, or instructions for storing, in memory of the application server, the certificate, receiving an access revocation message for the user device, transmitting, to the database of the database system, a deletion command for the user device based at least in part on the stored certificate, and removing, from the memory of the application server, the certificate.

In some examples of the method, apparatuses, and non-transitory computer-readable medium described herein, the public key identifier may comprise a key identification (ID) value. These examples of the method, apparatuses, and non-transitory computer-readable medium described herein may further include operations, features, means, or instructions for storing, in memory of the application server, an association between the public key of the public-private key pair and the key ID value. In some examples of the method, apparatuses, and non-transitory computer-readable medium described herein determining the public key of the public-private key pair based at least in part on the received public key identifier may include operations, features, means, or instructions for identifying the public key of the public-private key pair based at least in part on the received key ID value.

In some examples of the method, apparatuses, and non-transitory computer-readable medium described herein, validating that the session establishment message is received from the user device may include operations, features, means, or instructions for extracting metadata from the received key ID value, determining a user based on the metadata, identifying, in the memory of the application server, one or more associations between public keys and key ID values corresponding to the identified user, where the one or more associations includes the stored association between the public key and the key ID value for the user device, identifying the stored association between the public key and the key ID value according to the received key ID value and validating the private key using the public key of the stored association between the public key and the key ID value. In some examples of the method, apparatuses, and non-transitory computer-readable medium described herein, the metadata includes a tenant identifier, a user identifier, a user device identifier, or a combination thereof.

Some examples of the method, apparatuses, and non-transitory computer-readable medium described herein may further include operations, features, means, or instructions for transmitting, to the database of the database system, an indication of the association between the public key and the key ID value. Some examples of the method, apparatuses, and non-transitory computer-readable medium described herein may further include operations, features, means, or instructions for removing the association between the public key and the key ID value from the memory of the application server based on a TTL value, a cache-flushing command, or a combination thereof.

Some examples of the method, apparatuses, and non-transitory computer-readable medium described herein may further include operations, features, means, or instructions for receiving an additional session establishment message that may be based on the private key and that comprises the key ID value, determining that the association between the public key and the key ID value is not stored in the memory of the application server, retrieving, from the database of the database system, the association between the public key and the key ID value based on the transmitted indication and storing, in the memory of the application server, the association between the public key and the key ID value.

Some examples of the method, apparatuses, and non-transitory computer-readable medium described herein may further include operations, features, means, or instructions for receiving an access revocation message for the user device, transmitting, to the database of the database system, a deletion command for the association between the public key and the key ID value stored in the database based at least in part on the access revocation message, and invalidating a cache of the application server based at least in part on the access revocation message, wherein the cache of the application server stores the association between the public key and the key ID value.

In some examples of the method, apparatuses, and non-transitory computer-readable medium described herein, the session establishment message may comprise a client certificate message in an mTLS procedure. These examples of the method, apparatuses, and non-transitory computer-readable medium described herein may further include operations, features, means, or instructions for establishing a trusted mTLS connection between the application server and the user device based on the validating.

In some examples of the method, apparatuses, and non-transitory computer-readable medium described herein, the session establishment message may comprise an API call. In some examples of the method, apparatuses, and non-transitory computer-readable medium described herein, validating that the session establishment message is received from the user device may include operations, features, means, or instructions for identifying that the session establishment message is signed by the private key corresponding to the determined public key.

Some examples of the method, apparatuses, and non-transitory computer-readable medium described herein may further include operations, features, means, or instructions for storing, in the memory of the application server, a session token based on validating that the session establishment message may be received from the user device and processing additional API calls for the user device based on the session token.

Some examples of the method, apparatuses, and non-transitory computer-readable medium described herein may further include operations, features, means, or instructions for periodically validating, at the application server, that an additional session establishment message is received from the user device based on the stored association between the public key and the certificate and updating a TTL value for the session token in the memory of the application server based on the periodic validation.

In some examples of the method, apparatuses, and non-transitory computer-readable medium described herein, a header of the API call comprises the public key identifier and may be signed by the private key.

Some examples of the method, apparatuses, and non-transitory computer-readable medium described herein may further include operations, features, means, or instructions for generating, at the application server, the public-private key pair associated with the user device. Some examples of the method, apparatuses, and non-transitory computer-readable medium described herein may further include operations, features, means, or instructions for receiving a single-use token, where generating the public-private key pair may be triggered by receiving the single-use token.

Some examples of the method, apparatuses, and non-transitory computer-readable medium described herein may further include operations, features, means, or instructions for receiving, from the user device, an API call requesting access to the database of the database system and processing the API call for the user device based on the established database connection.

In some examples of the method, apparatuses, and non-transitory computer-readable medium described herein, the private key of the public-private key pair may be stored in volatile memory of the application server and the public key of the public-private key pair may be stored in persistent memory and cached on the application server.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for user device validation at an application server of a database system, comprising:
    transmitting, from the application server and to the user device, a private key of a public-private key pair and a public key identifier indicating a public key of the public-private key pair, the public key identifier comprising a key identification (ID) value corresponding to a user associated with the user device;
    storing, in memory of the application server, an association between the public key and the key ID value for the user device;
    receiving a session establishment message that is based at least in part on the private key and that comprises the key ID value;
    determining the user based at least in part on the received key ID value;
    identifying, in the memory of the application server, one or more associations between public keys and key ID values corresponding to the determined user and comprising at least the stored association between the public key and the key ID value for the user device;
    identifying the public key of the public-private key pair using the stored association between the public key and the key ID value and based at least in part on the received session establishment message;
    validating the private key using the public key of the stored association between the public key and the key ID value;
    validating, at the application server, that the session establishment message is received from the user device based at least in part on the validated private key; and
    establishing a database connection with a database of the database system in response to the validating that the session establishment message is received from the user device.

2. The method of claim 1, wherein validating that the session establishment message is received from the user device comprises:
    extracting metadata from the received key ID value, wherein determining the user is further based at least in part on the metadata.

3. The method of claim 2, wherein the metadata comprises a tenant identifier, a user identifier, a user device identifier, or a combination thereof.

4. The method of claim 1, wherein the session establishment message comprises a client certificate message in a mutual transport layer security (mTLS) procedure, the method further comprising:
establishing a trusted mTLS connection between the application server and the user device based at least in part on the validating that the session establishment message is received from the user device.

5. The method of claim 1, wherein the session establishment message comprises an application programming interface (API) call, and wherein validating that the session establishment message is received from the user device comprises:
identifying that the session establishment message is signed by the private key corresponding to the identified public key.

6. The method of claim 5, further comprising:
storing, in the memory of the application server, a session token based at least in part on validating that the session establishment message is received from the user device; and
processing additional API calls for the user device based at least in part on the session token.

7. The method of claim 6, further comprising:
periodically validating, at the application server, that an additional session establishment message is received from the user device; and
updating a time-to-live (TTL) value for the session token in the memory of the application server based at least in part on the periodic validation.

8. The method of claim 5, wherein a header of the API call comprises the public key identifier and is signed by the private key.

9. The method of claim 1, further comprising:
generating, at the application server, the public-private key pair associated with the user device.

10. The method of claim 9, further comprising:
receiving a single-use token, wherein generating the public-private key pair is triggered by receiving the single-use token.

11. The method of claim 1, further comprising:
receiving, from the user device, an application programming interface (API) call requesting access to the database of the database system; and
processing the API call for the user device based at least in part on the established database connection.

12. The method of claim 1, wherein:
the private key of the public-private key pair is stored in volatile memory of the application server; and
the public key of the public-private key pair is stored in persistent memory and cached on the application server.

13. The method of claim 1, further comprising:
transmitting, from the application server and to the database, an indication of the association between the public key and the key ID value, the database forwarding the association between the public key and the key ID value to at least one additional application server of the database system.

14. The method of claim 13, further comprising:
removing the association between the public key and the key ID from the memory of the application server based at least in part on a time-to-live (TTL) value, a cache-flushing command, or a combination thereof;
receiving an additional session establishment message that is based at least in part on the private key and that comprises the key ID value;
determining that the association between the public key and the key ID value is not stored in the memory of the application server;
retrieving, from the database of the database system, the association between the public key and the key ID value based at least in part on the transmitted indication; and
storing, in the memory of the application server, the association between the public key and the public key identifier.

15. The method of claim 13, further comprising:
receiving an access revocation message for the user device;
transmitting, to the database, a deletion command for the association between the public key and the key ID value stored in the database based at least in part on the access revocation message; and
invalidating a cache of the application server based at least in part on the access revocation message, wherein the cache of the application server stores the association between the public key and the key ID value.

16. An apparatus for user device validation at an application server of a database system, comprising:
a processor,
memory in electronic communication with the processor; and
instructions stored in the memory and executable by the processor to cause the apparatus to:
transmit, from the application server and to the user device, a private key of a public-private key pair and a public key identifier indicating a public key of the public-private key pair, the public key identifier comprising a key identification (ID) value corresponding to a user associated with the user device;
store, in memory of the application server, an association between the public key and the key ID value for the user device;
receive a session establishment message that is based at least in part on the private key and that comprises the key ID value;
determine the user based at least in part on the received key ID value;
identify, in the memory of the application server, one or more associations between public keys and key ID values corresponding to the determined user and comprising at least the stored association between the public key and the key ID value for the user device;
identify the public key of the public-private key pair using the stored association between the public key and the key ID value and based at least in part on the received session establishment message;
validate the private key using the public key of the stored association between the public key and the key ID value;
validate at the application server, that the session establishment message is received from the user device based at least in part on the validated private key; and
establish a database connection with a database of the database system in response to the validating that the session establishment message is received from the user device.

17. The apparatus of claim 16, wherein the instructions executable by the processor to cause the apparatus to validate that the session establishment message is received from the user device are further executable by the processor to cause the apparatus to:

extract metadata from the received key ID value, wherein determining the user is further based at least in part on the metadata.

18. The apparatus of claim 17, wherein the metadata comprises a tenant identifier, a user identifier, a user device identifier, or a combination thereof.

19. A non-transitory computer-readable medium storing code for user device validation at an application server of a database system, the code comprising instructions executable by a processor to:

transmit, from the application server and to the user device, a private key of a public-private key pair and a public key identifier indicating a public key of the public-private key pair, the public key identifier comprising a key identification (ID) value corresponding to a user associated with the user device;

store, in memory of the application server, an association between the public key and the key ID value for the user device;

receive a session establishment message that is based at least in part on the private key and that comprises the key ID value;

determine the user based at least in part on the received key ID value;

identify, in the memory of the application server, one or more associations between public keys and key ID values corresponding to the determined user and comprising at least the stored association between the public key and the key ID value for the user device;

identify the public key of the public-private key pair using the stored association between the public key and the key ID value and based at least in part on the received session establishment message;

validate the private key using the public key of the stored association between the public key and the key ID value;

validate, at the application server, that the session establishment message is received from the user device based at least in part on the validated private key; and establish a database connection with a database of the database system in response to the validating that the session establishment message is received from the user device.

* * * * *